(12) United States Patent
Sudarshanam et al.

(10) Patent No.: US 9,010,965 B2
(45) Date of Patent: Apr. 21, 2015

(54) SYSTEM AND APPARATUSES PROVIDING LASER ILLUMINATION WITH REDUCED OR ZERO SPECKLE

(75) Inventors: Venkatapuram Sudarshanam, Chesterbrook, PA (US); J. Michael Finlan, Doylestown, PA (US); Peter D. Olszak, Fort Washington, PA (US)

(73) Assignee: Clear Align LLC, Eagleville, PA (US)

( * ) Notice: Subject to any disclaimer, the term of this patent is extended or adjusted under 35 U.S.C. 154(b) by 65 days.

(21) Appl. No.: 13/356,557

(22) Filed: Jan. 23, 2012
(Under 37 CFR 1.47)

(65) Prior Publication Data
US 2013/0003343 A1    Jan. 3, 2013

Related U.S. Application Data

(60) Provisional application No. 61/461,712, filed on Jan. 21, 2011.

(51) Int. Cl.
*H01S 3/00*    (2006.01)
*G02B 27/48*    (2006.01)

(52) U.S. Cl.
CPC ...................................... *G02B 27/48* (2013.01)

(58) Field of Classification Search
USPC ................................................. 362/259, 553
See application file for complete search history.

(56) References Cited

U.S. PATENT DOCUMENTS

| | | | |
|---|---|---|---|
| 4,511,220 A | 4/1985 | Scully | |
| 5,943,132 A | 8/1999 | Erskine | |
| 6,418,258 B1 | 7/2002 | Wang | |
| 6,501,571 B1 | 12/2002 | Wang et al. | |
| 6,874,893 B2 * | 4/2005 | Park | 353/84 |
| 6,952,435 B2 | 10/2005 | Lai et al. | |
| 7,156,522 B2 * | 1/2007 | Plut | 353/31 |
| 7,944,598 B2 * | 5/2011 | Gollier | 359/279 |
| 7,997,735 B2 * | 8/2011 | Gollier | 353/30 |

(Continued)

FOREIGN PATENT DOCUMENTS

WO    WO 2011/039500    4/2011

OTHER PUBLICATIONS

Eichen, Speckle Measurements with a CCD Array; Applications to Speckle Reduction, Dissertation (online), Dec. 1982) [retrieved on May 18, 2012. Retrieved from the Internet: <URL: http://arizona.openrepository.com/arizona/bitstream/10150/184904/1/azu_td_8217407_sip1_m. pdf> pp. 3-4, 7, 14.

*Primary Examiner* — Peggy Neils
(74) *Attorney, Agent, or Firm* — Kenneth J. Lukacher Law Group

(57) ABSTRACT

A system is provided having a multiplexed laser source which combines the outputs of multiple lasers into multiplexed illumination which is then externally modulated to provide output illumination having reduced or zero speckle. Each of the laser sources are turned ON and OFF (gated) in a timed sequence to provide multiplexed illumination having a time-averaged speckle contrast that is lesser than the speckle contrast of the output of any one of the lasers. The output of one or more lasers may also be wavelength multiplexed, where the lasers operate at different wavelengths, and/or polarization multiplexed. An external modulator receives and modulates the multiplexed output in phase and/or modal power distribution to further reduce the speckle in the output of the system. The multiplexed laser source and external modulator can be used as separate apparatuses for reducing speckle in laser illumination.

19 Claims, 19 Drawing Sheets

(56) References Cited

U.S. PATENT DOCUMENTS

| | | | |
|---|---|---|---|
| 8,109,638 B2* | 2/2012 | Chen et al. | 353/31 |
| 2008/0185439 A1 | 8/2008 | Knowles et al. | |
| 2008/0259605 A1* | 10/2008 | Murase et al. | 362/259 |
| 2010/0103088 A1 | 4/2010 | Yokoyama et al. | |
| 2010/0118535 A1* | 5/2010 | Kusukame et al. | 362/259 |
| 2010/0165307 A1* | 7/2010 | Mizushima et al. | 353/98 |
| 2010/0232005 A1* | 9/2010 | Lescure et al. | 359/279 |
| 2010/0315621 A1 | 12/2010 | Sasaki et al. | |

\* cited by examiner

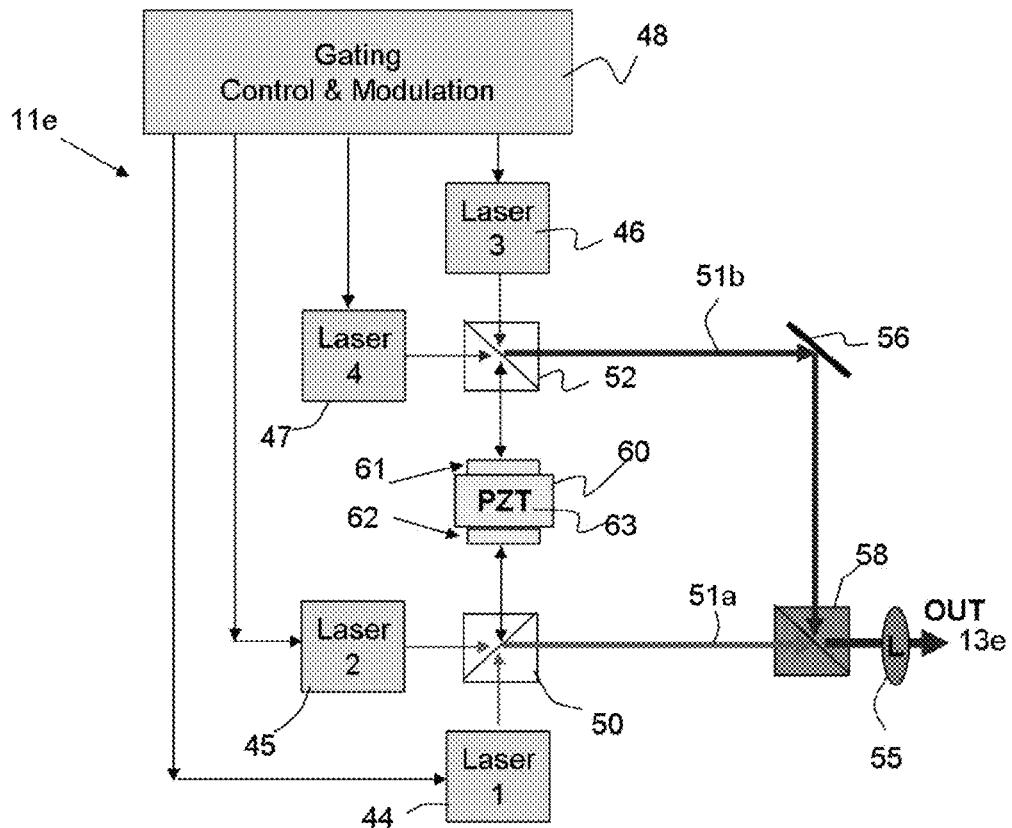
FIG. 8
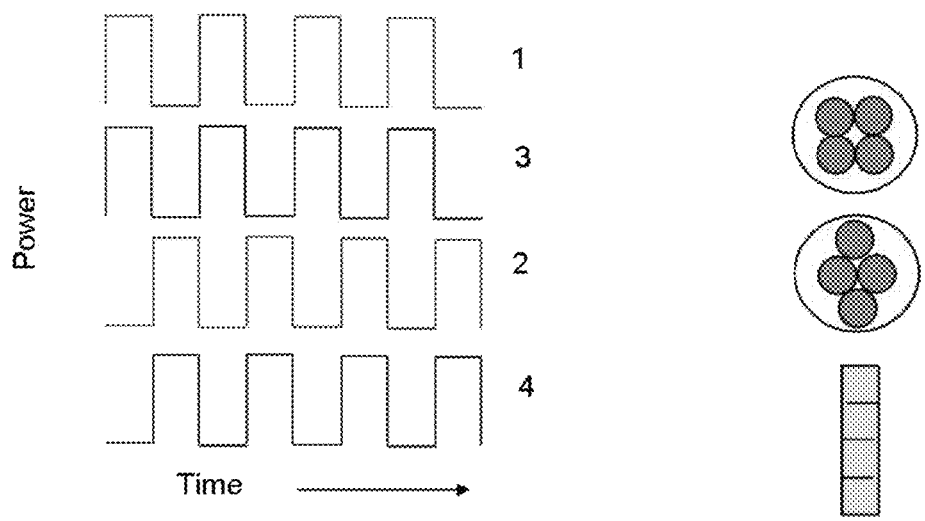
FIG. 9
FIG. 10

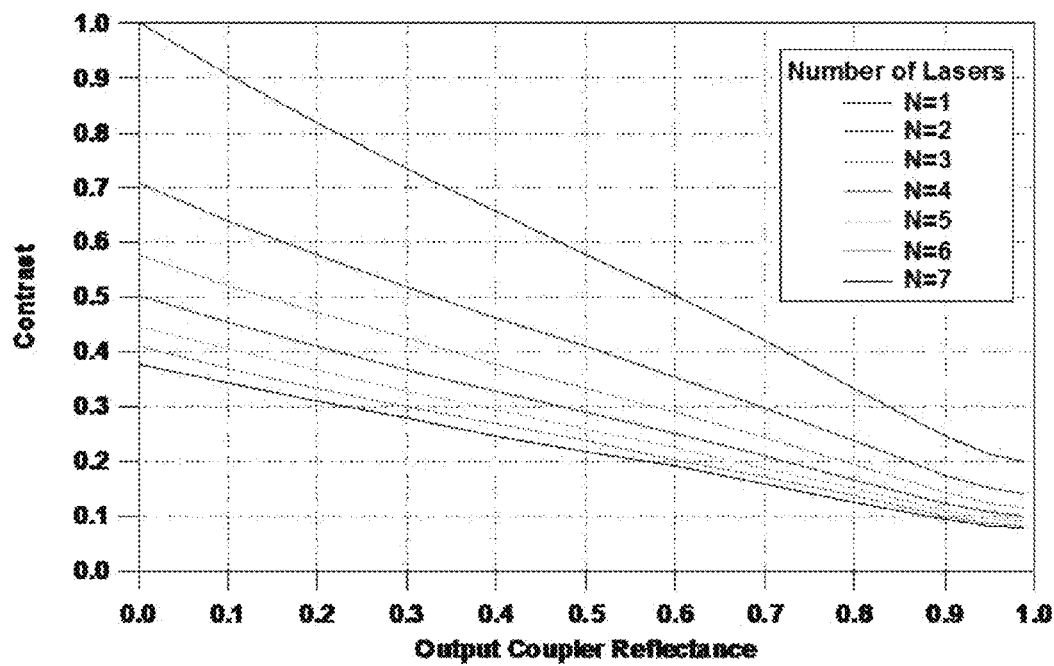
FIG. 33B
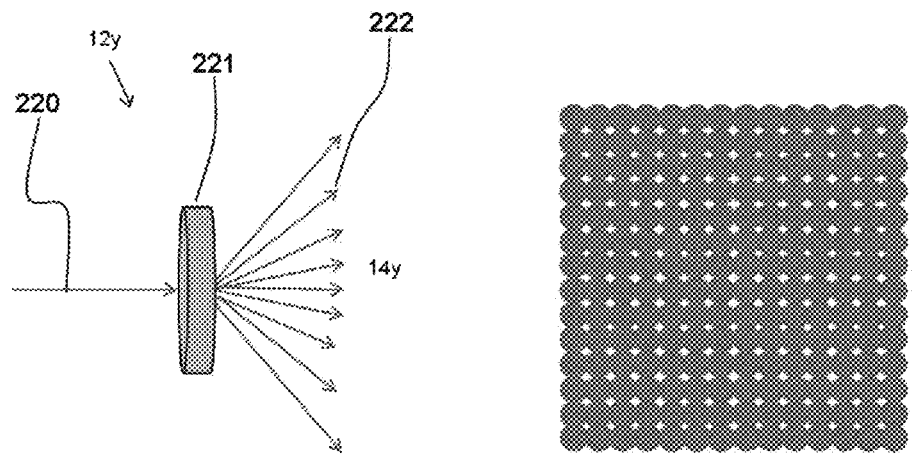
FIG. 34A
FIG. 34B

SYSTEM AND APPARATUSES PROVIDING LASER ILLUMINATION WITH REDUCED OR ZERO SPECKLE

This application claims the benefit of priority to U.S. Provisional Patent Application No. 61/461,712, filed Jan. 21, 2011, which is herein incorporated by reference.

FIELD OF THE INVENTION

The present invention relates to a system and apparatuses (and methods) providing laser illumination with reduced or zero speckle and particularly to systems having an apparatus (multiplexed laser source) which combines and time multiplexes the outputs of multiple lasers into multiplexed illumination to reduce speckle and another apparatus (external modulator) which modulates the multiplexed laser illumination to further reduce speckle when further reduction in speckle is desired. The multiplexed laser source and external modulator can also be used as separate apparatuses for reducing speckle in laser illumination. The systems and apparatuses of the present invention are useful in applications for imaging and targeting objects.

BACKGROUND OF THE INVENTION

Speckle-free laser illumination in the visible, infrared (IR) (e.g., IR (NIR), short-wave IR (SWIR), mid-wave IR (MWIR), or long-wave IR (LWIR)) and ultraviolet (UV) bands of wavelengths are of interest for several commercial, industrial, scientific and military applications. Laser illumination, for representative purposes of imaging and targeting objects, and distinguishing friend from foe, is of major interest to the military, especially at eye-safe wavelengths. SWIR illuminators are of particular interest because light at the SWIR wavelength is reflected by objects just as visible light is and enables imagery for identification through shadows and contrast.

Speckle can be eliminated by employing incoherent sources such as LED's. Lasers, on the other hand, provide the advantages of high power, low divergence and high brightness. The inherent coherence, both temporal and spatial, of lasers however results in speckle formation. Speckle in laser illumination is undesirable in imaging and targeting applications. One laser source for such low-speckle illumination is a vertical cavity surface-emitting laser (VCSEL) array. However, high power VCSEL arrays are not yet available at SWIR wavelengths. Thus, it would be desirable to reduce speckle utilizing conventional coherent lasers that are applicable to SWIR wavelengths and can also be used at other wavelengths, such as UV, visible or other IR bands.

SUMMARY OF THE INVENTION

Accordingly, it is an object of the present invention to provide a system having a multiplexed laser source which combines the outputs of multiple lasers into multiplexed illumination with less average speckle than in the output of any one of such multiple lasers and an external modulator which receives and modulates the multiplexed illumination to provide output laser illumination with further reduced speckle.

It is a further object of the present invention to provide different types of multiplexed laser sources and external modulators which can be utilized in combination or as separate apparatuses to provide reduced or speckle-free laser illumination.

Briefly described, the present invention embodies a system having a multiplexed laser source comprising N number of lasers, in which M of such N number of lasers are turned ON at the same time, and the outputs of the lasers are combined by optics to provide multiplexed illumination having a time-averaged speckle contrast that is lower when more than one laser is turned ON. An external modulator of the system then modulates the multiplexed illumination in at least phase to provide output illumination for the system with a further reduction in speckle. In addition to modulation in phase, the external modulator may further modulate the illumination from the multiplexed laser source in polarization and/or modal power distribution. Speckle generated by the temporal and spatial coherence of the N lasers is thus substantially reduced in the output illumination of the system.

Although described as components of the system, the multiplexed laser source and the external modulator can be used as separate apparatuses for reducing speckle in laser illumination.

Each of the laser sources of the multiplexed laser source may also be modulated by electronic circuitry to affect the temporal coherence in the output of the laser sources. The lasers may also be operated concurrently in a swept-mode or coherence collapse mode, as desired, by utilizing retro-reflective optical feedback provided in the system using a movable reflector or mirror with respect to optics which combines the output of any two of the laser sources so as to further reduce speckle in the output of the apparatus in conjunction with the modulation applied to the lasers by the electronic circuitry.

The multiplexed illumination of the multiplexed laser source may be one or more wavelengths and/or a combination of multiplexed polarizations. Further the multiplexed laser source may have a lens or lens system to focus or beam shape the multiplex illumination.

The external modulator can modulate the incident light beam, such as multiplexed illumination from the multiplexed laser source, using vibration induction devices, actuators, or material coupled to optical fibers/bulk-optic through which light passes through the modulator, an air gap between two different optical fibers through which light passes, or by passing the light through a recirculating interferometer. Modulation may be linear, periodic, chirped, pulsed or random, as a function of time. Where the modulation is periodic as a function of time, with the amplitude, m, the effective optical phase modulation may be set so that the value of the zeroth-order Bessel function, $J_0(m)$, of that amplitude, m, is zero. For example, the first five values m can take are 2.4048 rad, 5.5201 rad, 8.6537 rad, 11.792 rad, and 14.931 rad. A vibration induction device may be, for example, a vibrating optically transparent phase plate, piezoelectric thin film or electro-optic thin film. An incident laser beam may be focused on the phase plate or thin film, or nearly collimated on the phase plate or thin film, allowing a wide aperture for incidence. When incident light is received by an optical fiber, such optical fiber may be coiled and wound (with or without twist) with or around vibrating actuator(s) to achieve desired modulation for reducing speckle.

Preferably laser light incident on the external modulator, such as provided from the multiplexed laser source, enters a multimode optical fiber, preferably having a small core of approximately 50 to 65 μm. Such optical fiber is bonded onto an actuator inducing vibrator or is jacketed with the actuator material, inducing vibration. Vibration is induced at fiber's input end, fiber's output end, at both such ends, or along the length over which a vibration inducing means is coupled to the fiber. The optical fiber may optionally have a large core of greater than 65 μm, preferably greater than 200 μm and less than 1000 µm, that similarly has vibration induction. Vibration may also be induced by a vibrating single-point squeezed optical fiber, a vibrating actuator around which the optical fiber is coiled and wound, inducing distributed bending of the optical fiber. Such bending may be uniform over the length of optical fiber which is bonded to the vibrator, resulting in very large period, or infinite period, of bending; or the bending may have a period chirped over the length of the section of the optical fiber which is bonded to the vibrator, or multi-period of bending over such section. Such multi-period bending may be achieved by varying the period between concatenated discrete periodic sections along the length of the bonded section. The external modulator may be a resonator, diffuser, or diffractive optical element.

When the modulator uses a vibrating air gap formed between ends of two optical fibers along which the light entering the external modulator travels, the light coupled between the two optical fiber ends is over free space with a gap less than 10 µm, or the two optical fiber ends utilize refractive or diffractive optical elements, such as GRIN lenses, drum lenses, ball lenses, Fresnel lenses, spherical lenses, or lenses formed on the optical fiber tip itself, so that the coupling efficiency is enhanced relative to the flat-cleaved optical fiber tips.

The external modulator may also be provided by incident light split into multiple fibers, such as seven, that are then wound around a single vibrating actuator, and the light output from the multiple fibers recombined by juxtapositional bundling within a hexagonal form.

The external modulator may be provided by thermal modulation obtained from the waste heat generated by the lasers themselves, and a fiber coil is twisted and wound and placed in contact with the heat sink attached to the lasers in the multiplexed laser source. The heat generated by the lasers is utilized to sweep the interference fringes or speckle, so that the time-averaged speckle contrast is reduced substantially.

When the modulation is provided by a bulk optic, partial reflectors may be provided at the ends of the bulk optic with a matrix of pixels. The bulk modulator may be made from electro-optic thin film or piezoelectric polyvinylidene fluoride (PVDF) thin film, which is modulated to reduce speckle in light passing through the bulk optic.

When the external modulator has a recirculating interferometer, a vibrating actuator is provided within a recirculating interferometer that utilizes a single fiber coupler, so that light would traverse the actuator section multiple times over multiple round trips, and so that the output of the interferometer is a combination of a large number of such recirculated beams differing in optical phase, polarization and modal power distribution. Such recirculating interferometer may use multiple fiber couplers, so that light traverses multiple actuator sections, multiple times over multiple round trips through each such actuator section, and so that the output of the interferometer is a combination of a large number of such recirculated beams differing in optical phase, polarization and modal power distribution.

External optical phase-shifting modulation has the benefit in that interference fringe formation between multiple paths of the laser beams is totally eradicated when the laser sources are modulated at a rate higher than the signal detection rate, and the zeroth-order Bessel function of the phase shift amplitude equals zero. As speckle formation is based on multi-path interference, this provides reduced speckle or speckle-free in the output illumination of the system. Such external modulation is optional since it is not needed where the combined output from time-multiplexed laser has reduced speckle to the extent desired for a particular application of the system.

The system can provide uniform illumination, such as of top-hat or near-top-hat profile, which may be directed at a target of interest, such as in range-gated and ballistic imaging, either in single-shot or multi-shot operation. In addition to the laser sources being time-multiplexed, the outputs of the lasers may also be wavelength-multiplexed (WM) and/or polarization-multiplexed (PM). The wavelengths of the N lasers may be in the UV, visible, or IR bands.

A feature of the system is that modulation can be switched off at will, when and where not required under moderate speckle conditions and redundancy and multiplicity taken advantage of under harsher speckle conditions. Such freedom to select the level of speckle reduction in a "step-up" or "step-down" approach, allows electrical power to be saved and efficient use to be made of limited resources.

The present invention also provides a laser illumination source having reduced or zero speckle having first means along which laser illumination travels representing a combination of one or more laser sources, and second means for modulating the first means in one or more of optical phase, optical polarization and spatial optical power distribution, to provide illumination having less speckle than the laser illumination input to the first means. The first means may be provided by one or more multimode optical fibers or bulk-optical devices, while the second means represents one or more vibratory actuators coupled to the first means to enable at least phase modulation, or one or more of EM Types A-N of Table 1 below.

BRIEF DESCRIPTION OF THE DRAWINGS

The foregoing and other features, and advantages of the invention will become more apparent from a reading of the following detailed description in connection with the accompanying drawings in which:

FIGS. 7 and 8 are block diagrams of two types of the MLS of FIG. 1 with four lasers;

FIG. 9 is a timing diagram showing the time-multiplexed operation of a MLS of FIG. 1 with four lasers, where each laser has 50% duty cycle;

FIG. 10 is an illustration of three different types of spatial distributions of a MLS of FIG. 1 with four lasers;

FIG. 33A, 34A, and 35 are block diagrams of additional types of the EM of FIG.

FIG. 33B is a graph showing of speckle contrast versus output coupler reflections for N number of lasers, where N equals 1 to 7;

FIGS. 34B and 34C are illustrations of two types of output illuminations produced by the EM of FIG. 34 in response to incident light;

DETAILED DESCRIPTION OF THE INVENTION

Figure 1:
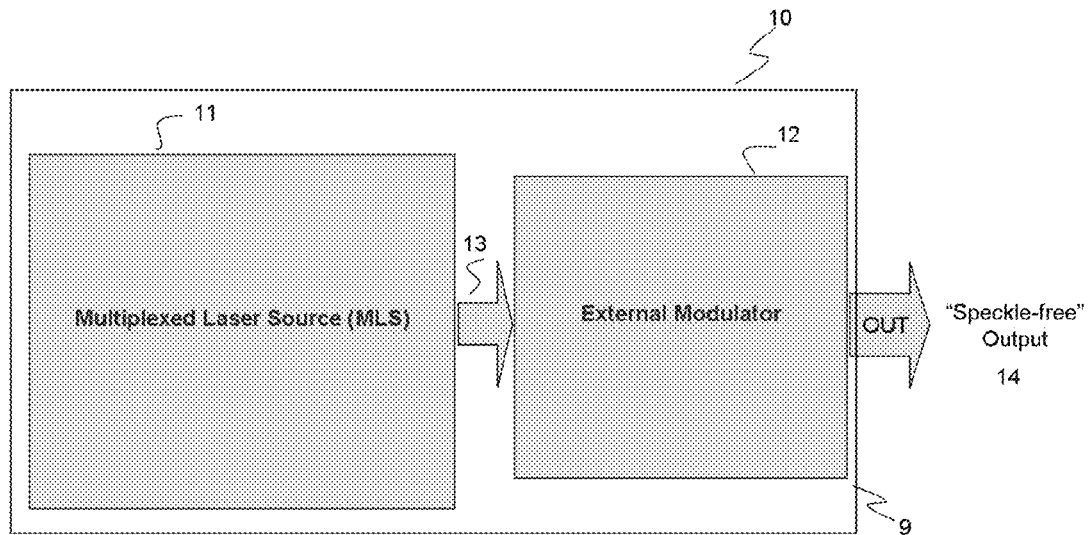
FIG. 1 is a block diagram of system of the present invention having a multiplexed laser source (MLS) and an external modulator (EM) for reduced speckle laser illumination.

The laser system 10 of the present invention can be divided into two sub-assemblies or apparatuses, namely, the modulated multiplexed laser source (MLS) 11 and the external modulator (EM) 12, as shown in FIG. 1. The output illumination 14 of the laser system 10 may consist of either (a) spatially overlapping multiple beams, sharing effectively a common aperture or (b) spatially resolved multiple beams over juxtaposed sub-apertures. As will be shown below, the MLS 11 has multiple laser sources, preferably modulated, which are gate time-multiplexed as to which lasers are ON and OFF in their combined output illumination 13, and may be polarization multiplexed, wavelength multiplexed, and/or have retro-reflective optical feedback. EM 12 operates upon multiplexed output illumination 13 by optical phase, and if desired also in modal power distribution modulation, to provide "speckle-free" laser illumination output which is defined herein as having reduced or zero speckle, thereby overcoming the temporal and spatial coherence of any one of the lasers of MLS, and avoiding the detrimental effects of speckle when output illumination 14 is used in imaging applications, such as range-gated ballistic images in either single shot or multishot operation. External modulator 12 may be optional in system 10 when MLS output illumination 13 has reduced speckle to the extent desired for a particular application of system 10. EM 12 is external since it is externally modulates optical laser illumination passing though device(s), e.g., optical fibers or bulk optical device. System 10 may be in a housing 9 as a stand-alone unit, or as a component of an imaging device. FIGS. 2, 4, 5, 7, and 8 show examples of different types of MLS 11 labeled 11a, 11b, 11c, 11d, and 11e, respectively, while FIGS. 11-17, 18A, 19A, 20-32, 33A, 34A, and 35 show examples of different types of EM 12 labeled 12a-z, respectively, in system 10. MLS 11e and EM 12a-z may also be utilized apart from each other in separate apparatuses or systems.

Figure 2:
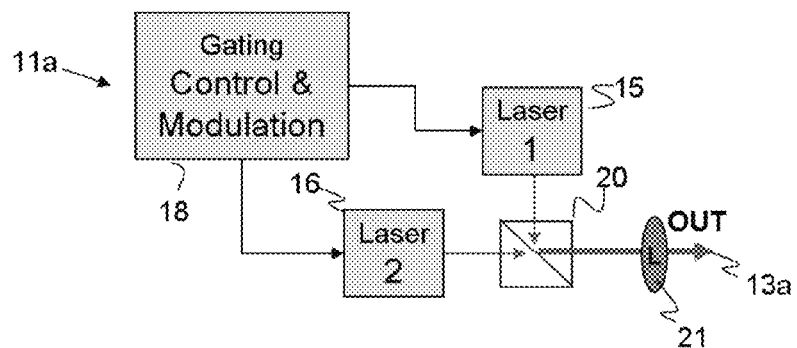
FIG. 2 is a block diagram of one type of the MLS of FIG. 1 with two lasers.
Figure 3:
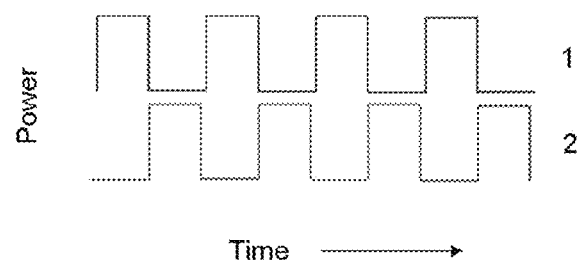
FIG. 3 is a timing diagram showing the time-multiplexed operation of a two lasers MLS of FIG. 1.

Referring to FIG. 2, MLS 11a is shown having two lasers 15 and 16 driven by gating control and modulation electronics 18 which time-multiplexes their operation and modulates the laser sources. An optical element 20 combines the output of lasers 15 and 16 to provide output illumination 13a, via a lens or lens system 21. Lens or lens system 21 affects the shape or focus of the output illumination 13a to provide a desired profile or shape. Where lasers 15 and 16 are operating at different wavelengths optical element 20 represents a wavelength combiner, such that the output illumination 13a is both time-multiplexed and wavelength multiplexed. For example, such different wavelengths of lasers 15 and 16 may be 830 and 850 nm, respectively. Where lasers 15 and 16 are operating at different polarizations, optical element 20 represents a polarization combiner, such that the output illumination 13a is both time-multiplexed and polarization multiplexed. For example, such different polarizations of lasers 15 and 16 may be linear horizontal and vertical, respectively. The time-multiplexing of lasers 15 and 16 is shown in FIG. 3, in which lasers 15 and 16 are labeled 1 and 2, respectively. At any time only one of lasers 15 and 16 are ON, while the other is OFF. For example, each square pulse shown in FIG. 3 may be $10^{-3}$ seconds in duration, to provide zero or reduced speckle output illumination beam 13a.

Gating control and modulation electronics 18 represents circuitry for modulating the laser output and for turning each laser 15 and 16 ON and OFF to provide the desired time sequencing of lasers, such as shown in FIG. 3. Such circuitry may be controlled by a controller (e.g., programmed microprocessor, or microcontroller) to electronically control (enable and disable) the laser source driver circuitry to carry out the desired gating. Gated modulation is preferably provided by electrical modulation by such circuitry in addition to switching lasers 15 and 16 ON and OFF, "gated modulated" is defined as applying laser drive current which switches such lasers ON and OFF at a rate faster than the ON-OFF switching rate (shown for example in FIG. 3) during the time each laser is turned ON. For example, when the switching rate is $10^3$ Hz, the gated modulating rate may be $10^6$ Hz. Gated modulation of the laser drive current can affect the temporal coherence of the gated lasers, thereby further reducing the cause of speckle.

Figure 4:
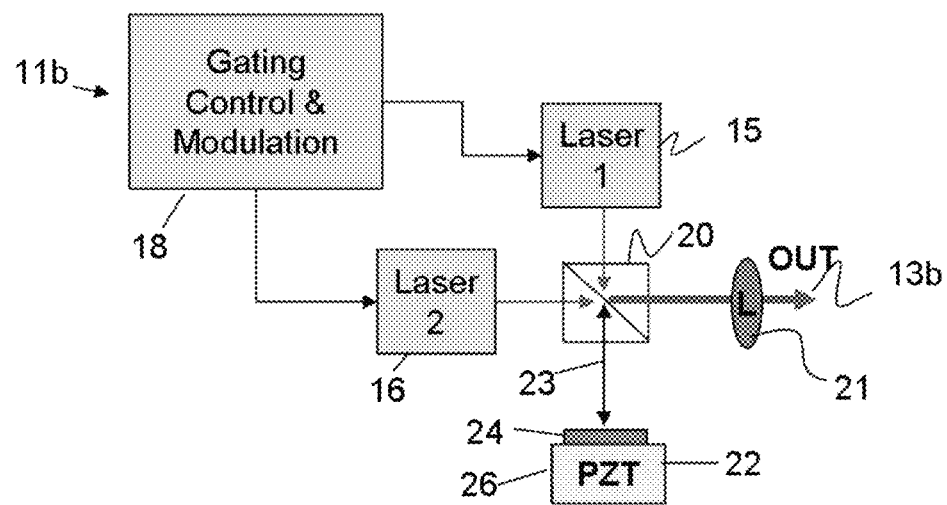
FIG. 4 is a block diagram of another type of the MLS of FIG. 1 with two lasers.

To further reduce speckle, FIG. 4 shows an MLS 11b which is the same as MLS 11a with the addition of the feedback element 22 having feedback from a reflective surface 24 mounted on a PZT element 26 to provide retro-reflective optical feedback via light path 23. In this case, gated modulation is provided by electronics 18 and lasers 15 and 16, which are operated concurrently in a swept-mode or coherence collapse mode.

Optical element 20 such as shown in the figure combines light into spatially resolved (partially overlapping) or non-spatially resolved output 13b; however some of the light is reflected away from optical element 20 along path 23 which would otherwise be lost. In MLS 11b, this light is reflected back along the same path 23 to optical element 20 by reflective surface 24 mounted to PZT element 26 which may be a cat's eye reflector (CER) or a chirped mirror (CM) thereby utilizing light which would otherwise be lost to provide retro-reflective optical feedback. A CM is a dielectric mirror, such as used for dispersion compensation in mode-locked lasers. A CER is a retro reflector having a refracting optical element with a reflective surface, in which the focal surface of the refractive element coincides with the reflective surface. Other than the optical feedback element 22, the operation of the MLS 11b is otherwise the same as MLS 11a. The PZT device 26 used to move the reflective surface 24 such that the length of light path 23 is varied. The phase difference of light path 23 is also modulated as the PZT device 26 voltage is modulated. This modulation of the light provided by the optical feedback element 22 reduces the temporal coherence of lasers 15 and 16 further reducing speckle. The PZT device 26 voltage may be modulated internally through an integrated feedback mechanism or externally by the gating control and modulation electronics 18.

The imaging optics 21 generally represented by the lens may be a combination of lenses as per application-specific requirements, neither of which limit in any way the novelty, validity and general scope of the other devices of the invention and its various embodiments described herein. The imaging optics 21 may be used to improve coupling from the MLS 11 into the EM 12 through for example focused coupling into a multimode fiber (MMF) 70.

Figure 5:
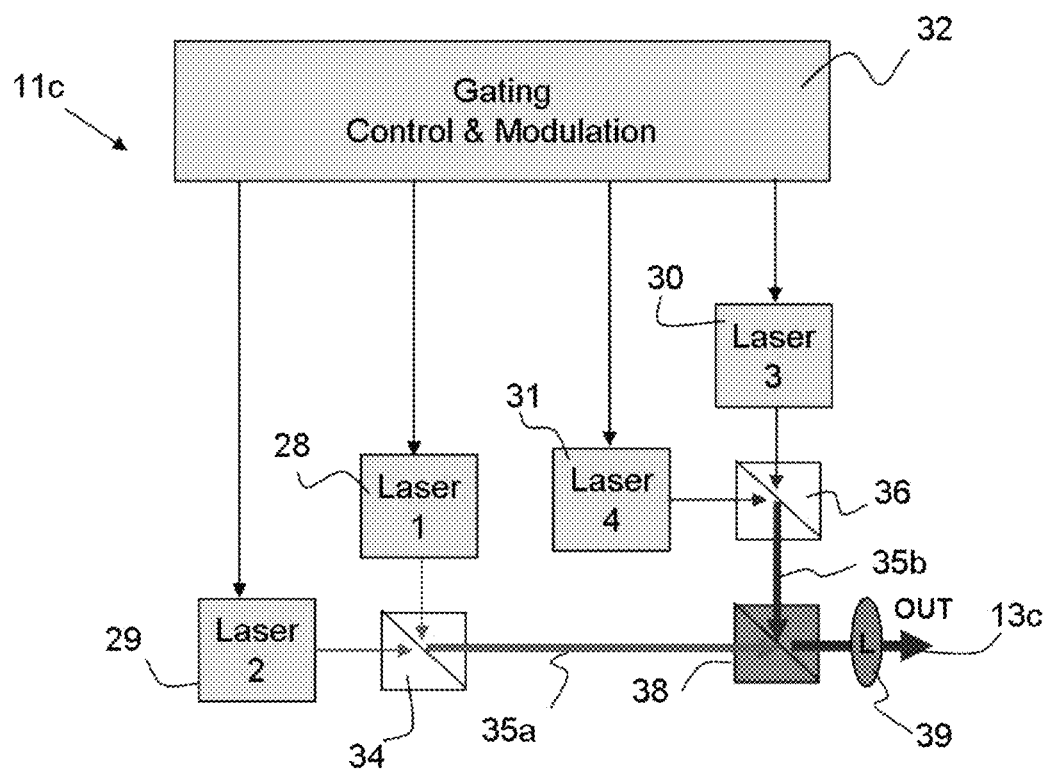
FIG. 5 is a block diagram of one type of the MLS of FIG. 1 with four lasers.
Figure 6:
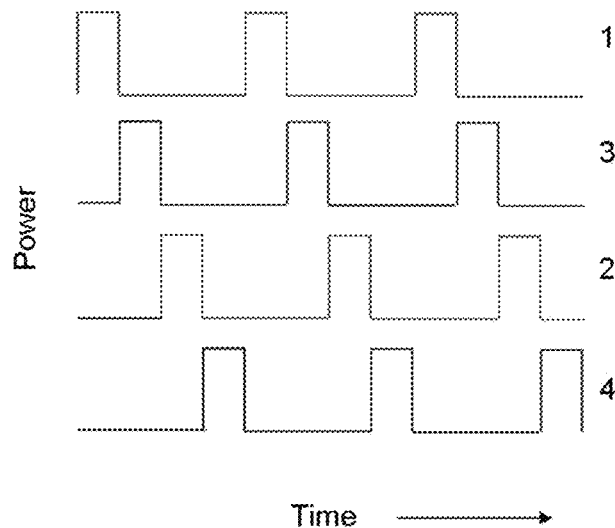
FIG. 6 is a timing diagram showing of the time-multiplexed operation of a MLS of FIG. 1 with four lasers, where each laser has 25% duty cycle.

Referring to FIG. 5, MSL 11c is shown having four lasers 28, 29, 30, and 31 driven by gating control and modulation electronics 32 to time-multiplex their operation. Each laser is operated by electronics 32 in the same manner as electronics 18 of MLS 11a and 11b to provide the time multiplexing shown in FIG. 6 where each laser 28, 29, 30, and 31 is represented by numerals 1, 2, 3, and 4, respectively. An optical element 34 combines the output of lasers 28 and 29 into illumination path 35a, and optical element 36 combines the output of lasers 30 and 31 into illumination path 35b. Light along paths 35a and 35b are combined by optical element 38 to provide output illumination (or beam) 13c, via a lens or lens system 39. Lens or lens system 39 may be the same as lens or lens system of imaging optics 21 to affect the shape or focus of the output illumination 13c. Preferably, lasers 28 and 30 operate at one linear polarization while lasers 29 and 31 operate at the orthogonal linear polarization. In addition, lasers 28 and 29 operate at one wavelength while lasers 30 and 31 operate at a second wavelength. Optical element 34 represents a polarization combiner, while optical element 36 represents a wavelength combiner. The switching of the lasers as shown in FIG. 6 represents the case of a 25% duty cycle of each laser, in which at any time only one of lasers 28-31 is ON, while all others are OFF. For example, lasers 28-31 may be 830, 830, 850, 850 nm, respectively, where lasers 28 and 29 are at different orthogonal polarizations from each other, and lasers 30 and 31, are at different orthogonal polarizations from each other. Each square pulse for example may be $10^{-3}$ seconds in duration, to provide zero or reduced speckle output beam 13c.

Figure 7:
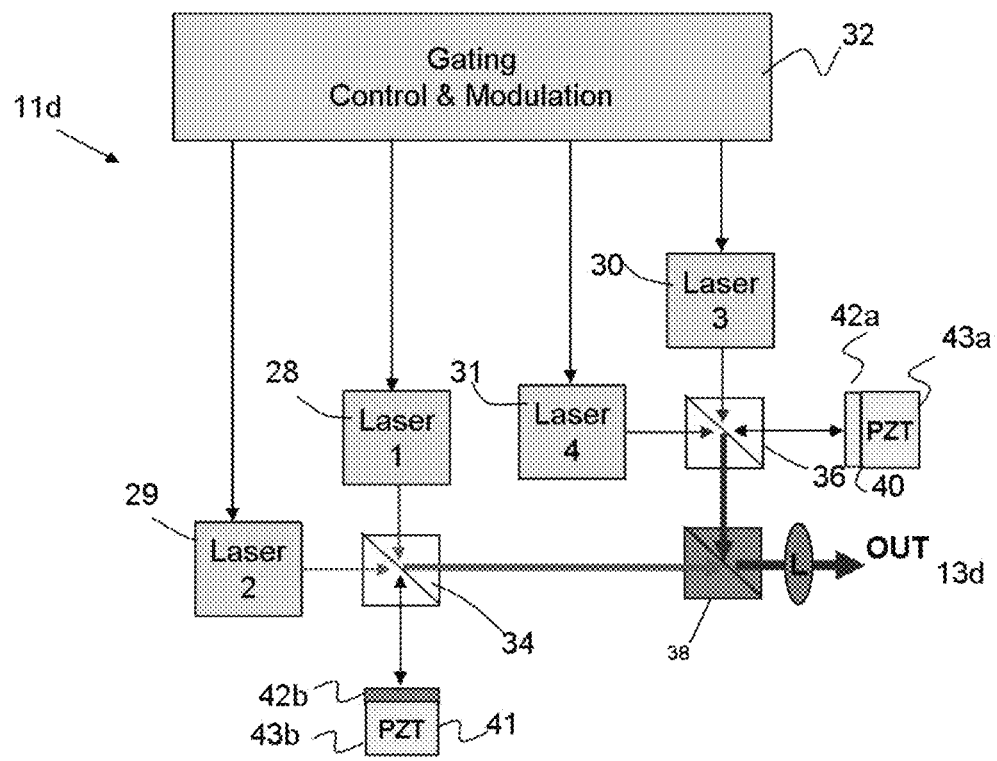

To further reduced speckle, FIG. 7 shows MLS 11d which is the same as MLS 11c with the addition of the feedback elements 40 and 41 having feedback from a reflective surface 42a and 42b mounted on PZT elements 43a and 43b, respectively. Reflective surfaces 42a and 42b may each be a CER or CM. Feedback elements 40 and 41 are each the same as optical feedback element 22, and operate in the same manner with respect to their associated combiner optical elements 36 and 34, respectively. The operation of the MLS 11d is otherwise the same as MLS 11c. Thus, MLS 11c and 11d each represent the case of an MLS which is time-multiplexed, polarization-multiplexed, and wavelength multiplexed.

Referring to FIG. 8, an MSL 11e is shown having four lasers 44, 45, 46, and 47 driven by gating control and modulation electronics 48 to time-multiplex their operation. Each laser is operated by electronics 48 in the same manner as electronics 18 or 32 of MLS 11a-d to provide the time multiplexing shown in FIG. 6, where each laser 44, 45, 46, and 47 is represented by numerals 1, 2, 3, and 4, respectively. Optionally, each laser is operated by electronics 48 to provide the time multiplexing shown in FIG. 9 which represents the case of a 50% duty cycle of each laser (see also Table 2 later below and discussion thereof), in which at any time only two of lasers 44-47 are ON, while the other two lasers are OFF.

In MLS 11e, an optical element 50 combines the output of lasers 44 and 45 into illumination path 51a, and optical element 52 combines the output of lasers 46 and 47 into illumination path 51b. The light along paths 51a and 51b (as reflected by mirror 56) are combined by optical element 58 to provide output illumination 13e, via a lens or lens system 55. Lens or lens system 55 is optional, but useful so that the output illumination 13e is of a desired profile or shape. A feedback element 60 is provided having two reflective surfaces 61 and 62 mounted on opposite sides of a PZT element 63 facing combiner optical elements 52 and 50, respectively. Reflective surfaces 61 and 62 may each be provided by a CER or CM. Each reflective surface 61 and 62 along feedback element 60 may be the same as optical element 22, and operates in the same manner with respect to its associated combiner optical elements (50 and 52, respectively). Preferably, lasers 44, 45, 46, and 47 are each operating at a different polarization and at different wavelengths, and optical element 50 and 52 each represent a polarization combiner, while optical element 58 represents a wavelength combiner. Lasers 44-47 may also operate in the same manner as lasers 28-31. Output illumination 13e is thus time-multiplexed, polarization-multiplexed, and wavelength multiplexed. The output illumination 13e may be spatially resolved and partially overlapping, such as shown by the three examples of FIG. 10, where in each of the three examples shown, a square or circle represents one of lasers 44-47.

In MLS 11, the number of lasers may be any number greater than one, preferably four, but system 10 complexity increases with large number of individual lasers. Each of the optical elements 20, 34, 36, 38, 50, 52, 58 may be beam splitters for combining laser output beams incident thereto as illustrated in FIGS. 4, 5, 7, and 8. Polarization multiplexing is preferred as such enables the addition of individual laser powers, without excessive losses, from orthogonally polarized lasers, while also reducing the speckle effects by virtue of polarization diversity. Wavelength-multiplexing enables the addition of the powers from two pairs of polarization-multiplexed lasers, while also reducing the speckle effects by virtue of wavelength diversity. Thus, for example, a 4-Watt MLS 11 consisting of four 1-Watt lasers 29-30 would result in lesser impact from speckle, due to polarization and wavelength diversity, than a monolithic single-chip laser with 4-Watt output.

The gating of the laser sources in system 10 affects both the subjective and objective speckle, which depends closely on the characteristics of the laser sources as well as the beam path from the laser source to the target of interest. Thus, the speckle pattern will change substantially as the operating laser is simply switched between the two or four available lasers. The detector or imaging system using MLS 11 preferably averages or integrates over an extended period of observation time, thus reducing the effective speckle. Such gating also allows the achievement of different total power levels, on adjustment of the pulse parameters for each laser. As stated earlier, gate modulation directly modulates the lasers to affect the temporal coherence of the lasers. Also preferably, the lasers may also be operated concurrently in a swept-mode or coherence collapse mode as desired, by utilizing retro-reflective optical feedback from a cat's eye reflector or a chirped mirror in conjunction with the gated modulation applied to the laser drive current.

Although MLS 11 of FIG. 1, as described by MLS 11a-e, is useful to reduce speckle in their respective multiplex illumination output 13a-e which is less than the average speckle of any one of their respective lasers, preferably the illumination output passes to an EM 12 which operates to provide speckle free output illumination 14, as described earlier. The different types of EM 12 labeled 12a-v are described below.

Figure 11:
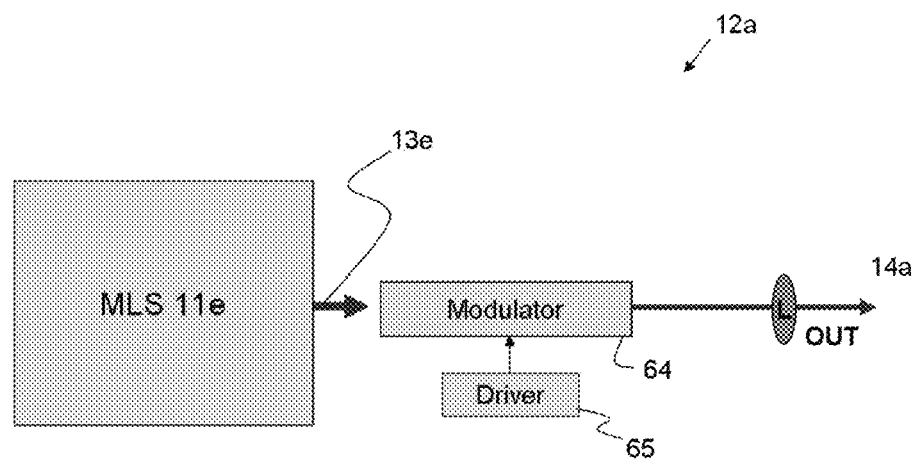
FIGS. 11-17, 18A, 19A, and 20-32 are block diagrams of different types of the EM of FIG. 1 in which the MLS of FIG. 8 is shown for example as providing incident laser illumination to the EM.
Figure 12:
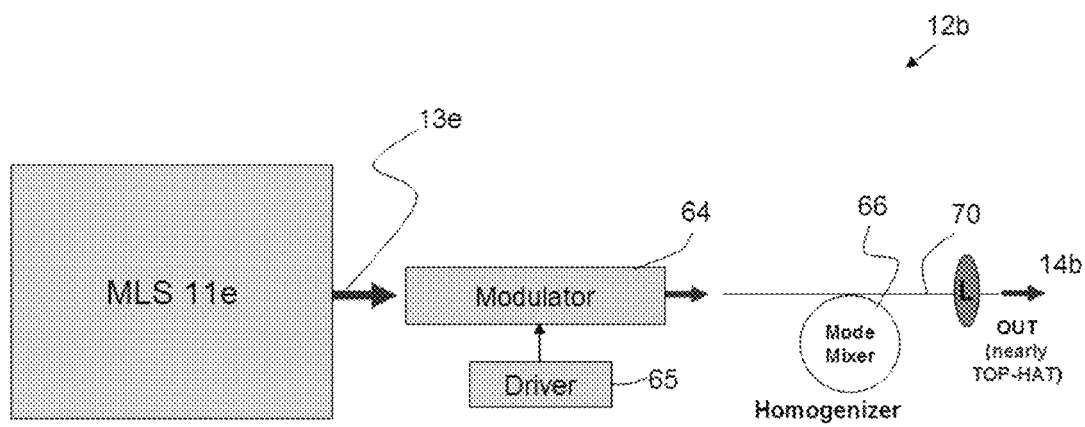

FIG. 11 has MLS 11e and EM 12a provided by a bulk-optic modulator 64 with partial mirrors/reflectors which is driven by driver 65 to provide output illumination 14a. FIG. 12 shows the EM 12b which is the same as EM 12a, but with a mode scrambler or mode mixer homogenizer 66 which reduces the objective speckle identified with spatial modes of the MMF to provide output illumination 14b which in nearly top-hat.

Figure 13:
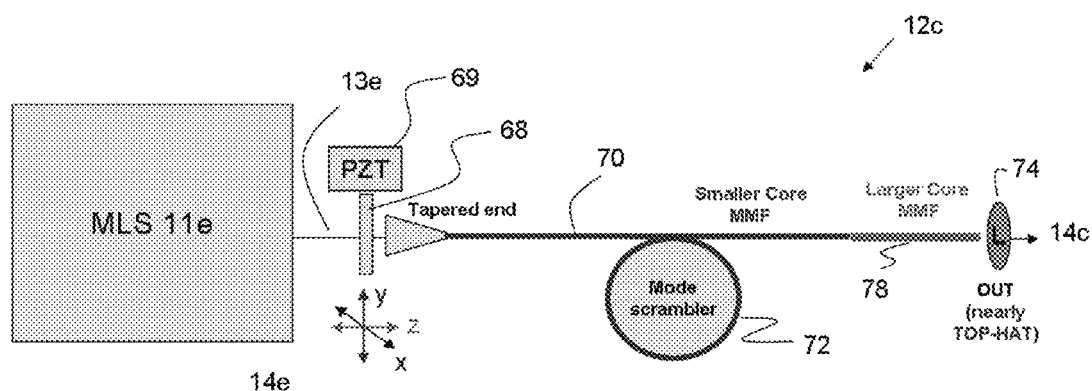
Figure 14:
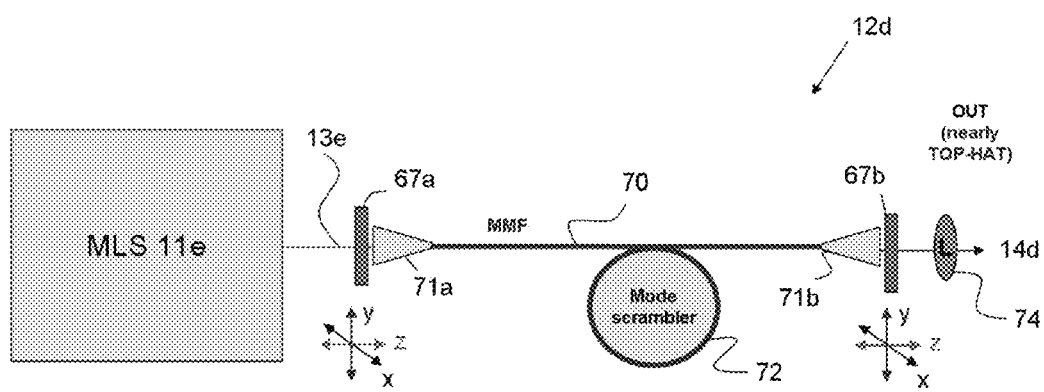

In FIG. 13, MLS 11e illumination 13e passes through a phase plate 68 which is mounted to a PZT device 69 which controls the position of phase plate 68 in x, y, z dimensions to provided a desired phase change to illumination 13e prior to passing into a small core (for example 0.05 mm) multimode optical fiber (MMF) 70 which is coiled to provide a mode or mode scrambler 72, and then to a larger core (for example 1 mm) MMF 73 to provide output illumination 14c, via lens or lens system 74. Modulator 64 of FIG. 12 is provided in FIG. 13 by elements 68 and 69, and where mode scrambler or mixer 66 (when present) by the coiled part (scramber 72) of MMF 70. PZT 69 is controlled by a voltage that may be modulated internally through an integrated feedback mechanism or externally by the gating control and modulation electronics 48 to vibrate input end 71a to provide desired speckle-free output 14c. FIG. 13 represents EM Type A(b) and B in Table 1 below. MMF 70 preferably is of small core. Alternatively, PZT device 69 and phase plate 68 may be replaced by a vibrating transparent PVDF film 67a and 67b each with ITO electrodes on either side of MMF 70, as shown in FIG. 14, at its respective input and output ends 71a and 71b of MMF 70, to provide output illumination 14d, via lens or lens system 74. FIG. 14 represents EM Type A(b), B, and C in Table 1 below. Transparent PVDF films 67a and 67b are each piezoelectric (movable along x, y, z dimensions) and similarly controlled as PZT device 69. PVDF films 67a and 67b may be uniform, patterned with matrix or pixels, laminated, or multilayered.

Figure 15:
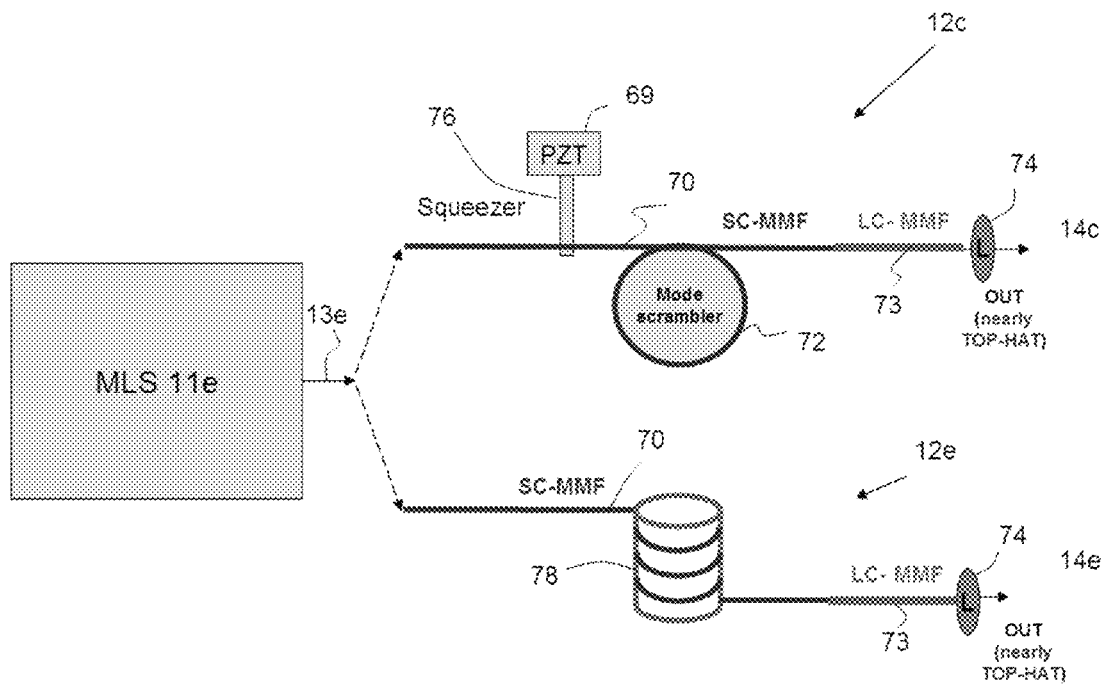

FIG. 15 shows two types of external modulators, one EM 12c which is the same as EM 12c of FIG. 13, but without taper end 71a, and having a squeezer 76 instead of a phase plate 68 to MMF 70 from MLS illumination 13e. The squeezer 76 applies direct mechanical compression derived from the translation of PZT 69 and directly vibrates small core MMF 70 without phase plate 68. The upper EM 12c of FIG. 15 represents an EM Type D of Table 1 below. FIG. 15 also shows EM 12e in which PZT 69 and mode scrambler 72 of MMF 70 are replaced by MMF 70 being wound around a PZT tube (or cylinder) 78. MLS illumination 13e is received by MMF 70 part of which is wound about PZT tube 78, which then passes into a large core MMF 73 to provide output illumination 14e, via lens or lens system 74. PZT tube 78 is movable to vibrate MMF 70. The lower EM 12e of FIG. 15 represents EM Type G(a) in Table 1 below. Both upper and lower EMs of FIG. 15 receive all or a portion of MLS illumination 13e.

Figure 16:
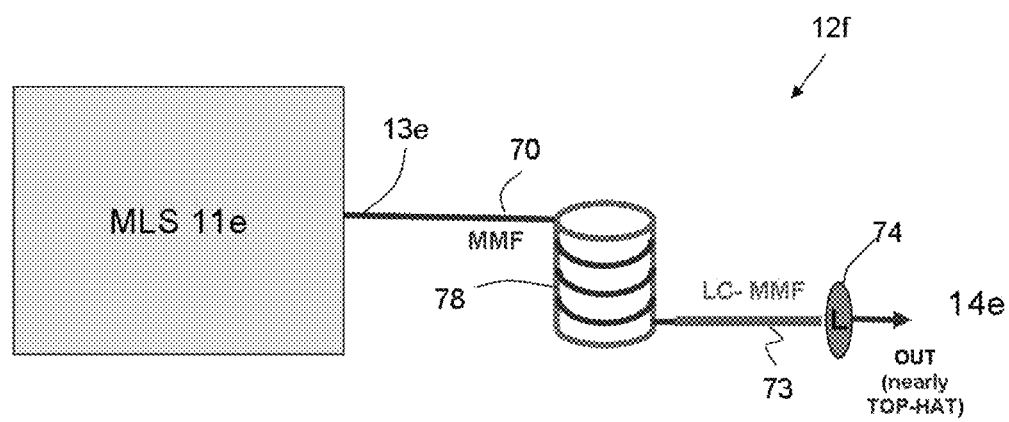

FIG. 16 shows an EM 12f which is the same as EM 12e, but with the MMF both wound and twisted about PZT tube 78, in which the twist enhances mode coupling. FIG. 16 represents EM Type G(a) in Table 1 below.

Figure 17:
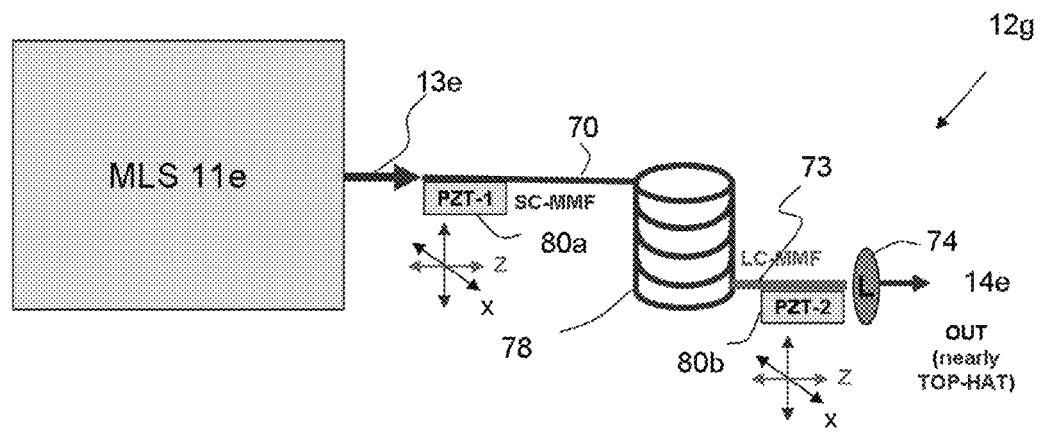

FIG. 17 shows an EM 12g which is the same as EM 12e, but with two additional PZT devices 80a and 80b, one at the input of MMF 70 and the other along large core MMF 73. All three PZT devices 80a, 80b, and 78 can be vibrated. FIG. 17 represents EM Type G(a), B, and C of Table 1 below.

Figure 18A:
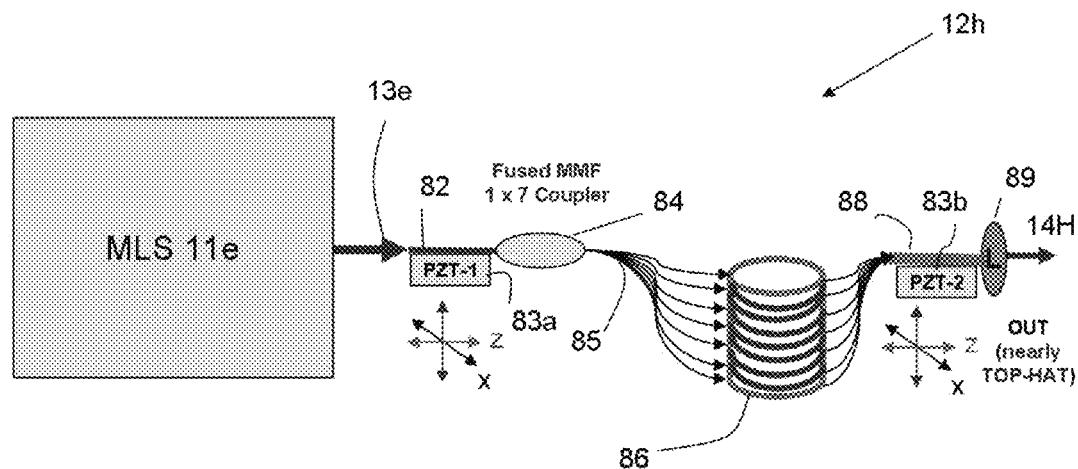
Figure 18B:
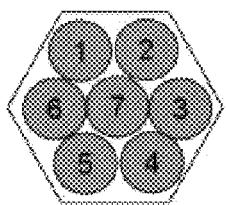
FIG. 18B is an illustration of the spatial distribution of seven beams from the EM of FIG. 18A.

FIG. 18A shows an EM 12h which received MLS illumination 13e into a MMF 82 coupled to PZT 83a to be vibrated, and then MMF 82 is fused to a 1×7 coupler 84 in which outputs from coupler 84 are fused to seven optical fibers 85 that are wound on a cylindrical PZT tube 86 and then outputted into a large core MMF 88 to provide output illumination 14h, via lens or lens system 89. Another PZT device 83b is coupled to MMF 88. The beams from each of the fibers 85 provide spatially resolved outputs as shown for example in FIG. 18B in which each of fibers 85 is labeled 1 to 7. All three PZT devices 83a, 83b, and 86 can be vibrated. FIG. 18A represent modulation and mode-mixing combined into a single device, thereby representing EM Type G(b) with B and C of Table 1 below.

Figure 19A:
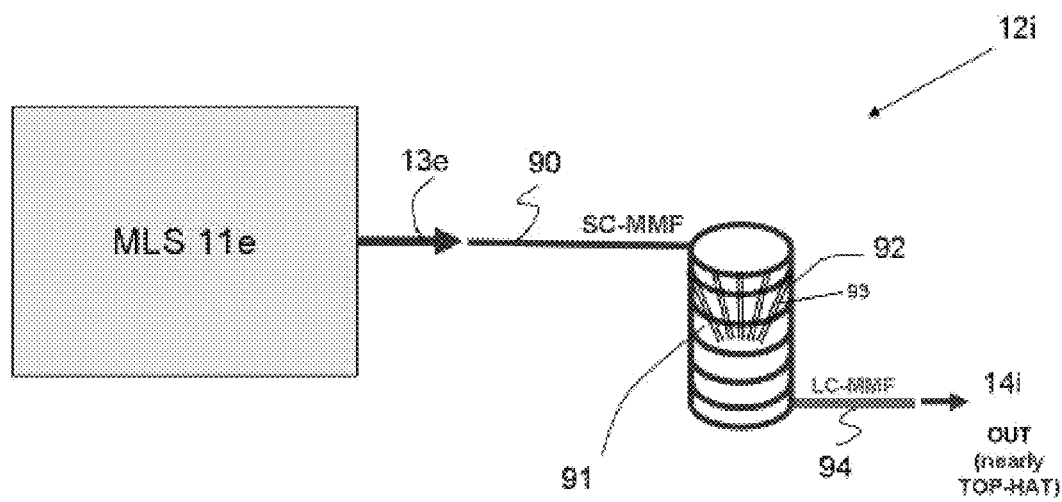

FIG. 19A shows an EM 12i which receives MLS illumination 13e into small core MMF 90 which is wound and twisted on a PZT device 92 using metal pins 93 to provide a microbend generator matrix 91, and then passes through a large core MMF 94 to provide output illumination 14i. Winding MMF 90 around PZT device 92 results in bends about PZT device 92, while metal pins 93 are wound with the MMF 90 along the PZT device 92 and arranged in a chirped-period configuration to form microbend generator matrix 91. PZT device 92 may be one of a cylindrical tube (as shown), disc, plate, or other vibration actutable device upon which MMF 90 can be wound. Four different distributions of pins 93 about the wound MMF 90 are shown by "a, b, c, and d" of FIG. 19B in an example of four instances of MMF 90 along a common surface of PZT device 92.

Figure 19B:
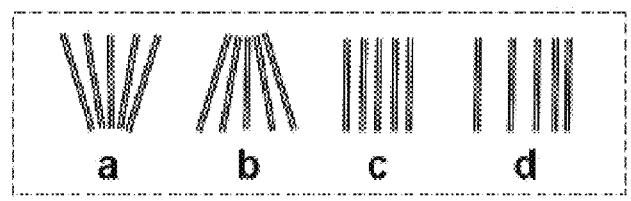
FIG. 19B are illustrations of different orientations of vibrator actuators along an optical fiber coiled in FIG. 19A.
Figure 36:
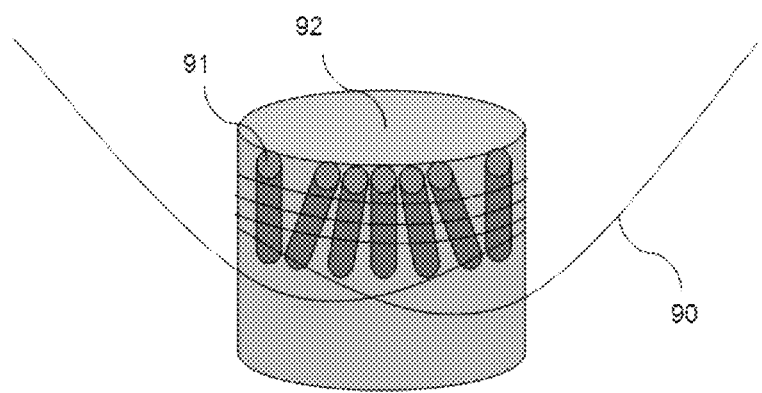
FIG. 36 is an illustration of the EM of FIG. 19A of type b of FIG. 19B of the microbend generator matrix of the EM of FIG. 19A resulting in concurrent modulation of phase, polarization and modal power distribution.

An example of microbend generator matrix 91 is shown in FIG. 36 which combines the phase modulator in the microbend generator matrix of EM 12i utilizing two 5-meter sections of MMF wound over a single piezoelectric PZT device 92 provided by a cylinder. Metal pins 93 arranged in a chirped-period configuration form the microbend generator matrix 91, while the smooth surface of the PZT cylinder results in uniform phase modulation in the remaining sections. One advantage of this chirped-period configuration is that the frequency response is quite flat over a large range of frequencies. Distribution of metal pins "a" is schematically shown in FIG. 19B, while another distribution of pins "b" is shown in FIG. 36. Other periodic or non-periodic configurations may also be used to obtain the desired modulation response. The FIG. 19A represents EM Type G(a) and E of Table 1 below.

Figure 20:
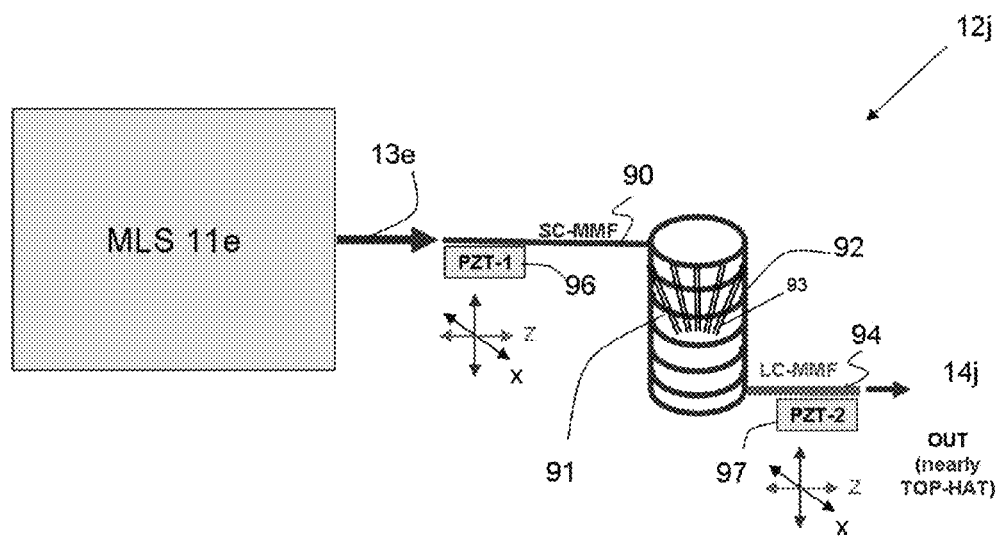

The EM 12j of FIG. 20 is the same as the EM 12i of FIG. 19, but with PZT device 96 and 97 being coupled to or near the input of MMF 90 and MMF 94, respectively, to provide output illumination 14j. All three PZT devices 92, 96, and 97 can be vibrated. FIG. 20 represents a combination of EM Type G(a), E, B, and C of Table 1 below.

Figure 21:
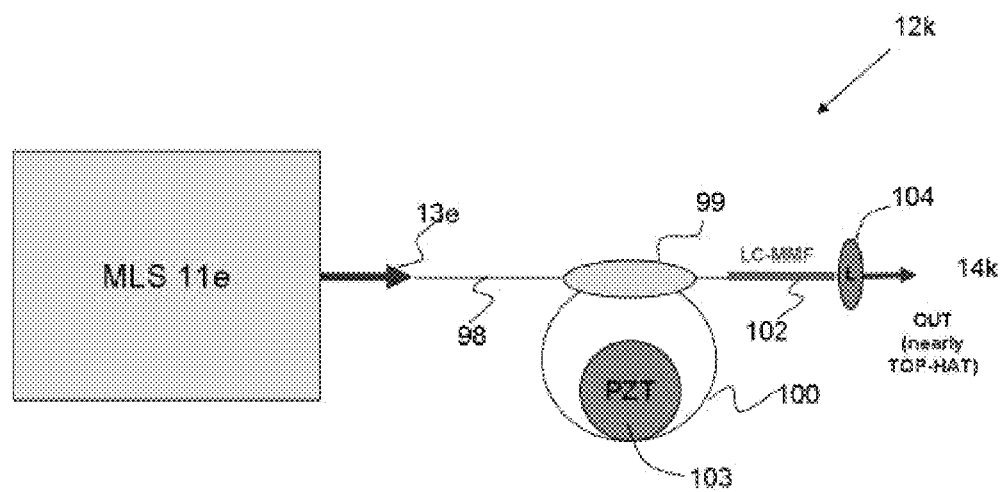
Figure 22:
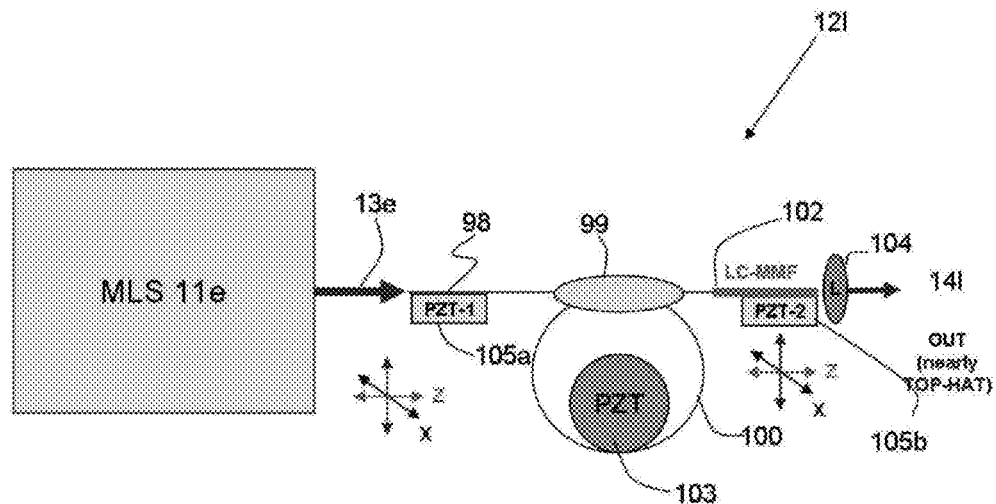

EM 12 may have a recirculation interferometer as shown in EM 12k-v of FIGS. 21-31 which operates upon MLS output illumination 13e to provide speckle free output illumination 14k-v, respectively. In the EM 12k of FIG. 21, a fiber coil 100 (such 5m in length) is twisted and wound (about its length) upon a PZT tube 103 in a desired microbend generator matrix, such as described earlier by matrix 91. The MMF 98 which received MLS output illumination 13e is fused by a fiber coupler 99 to coil 100 and is reciruclated within coil 100 until output via large core MMF 102 and lens or lens system 104 to provide output illumination 14k. The EM 121 of FIG. 22 is the same as EM 12k of FIG. 21, but with PZT device 105a and 105b being coupled to or near the input of MMF 98, and to MMF 102, respectively, to provide output illumination 14j. All three PZT devices 100, 105a, 105b can be vibrated. FIG. 21 represents a combination of EM Type J, G, and E, and FIG. 22 represents a combination of EM Type J, G, E, B, and C of Table 1 below.

Figure 23:
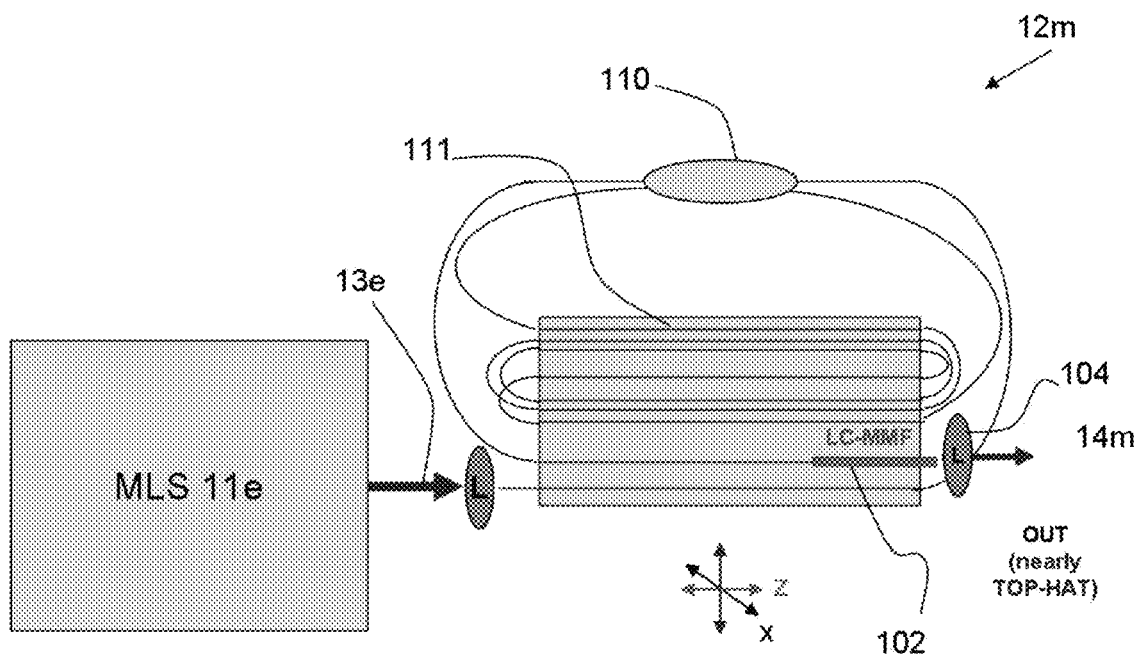

The EM 12m of FIG. 23 is substantially the same as the EM 12k of FIG. 21, but with fiber coil 100 and PZT tube 103 replaced by the fiber coil/loop 111 with uniform bending, to provide output illumination 14 m. The fiber coupler 99 of FIG. 21 is the same as the fiber coupler 110. FIG. 23 represents a combination of EM Type G(a), E(a), and J of Table 1 below.

Figure 24:
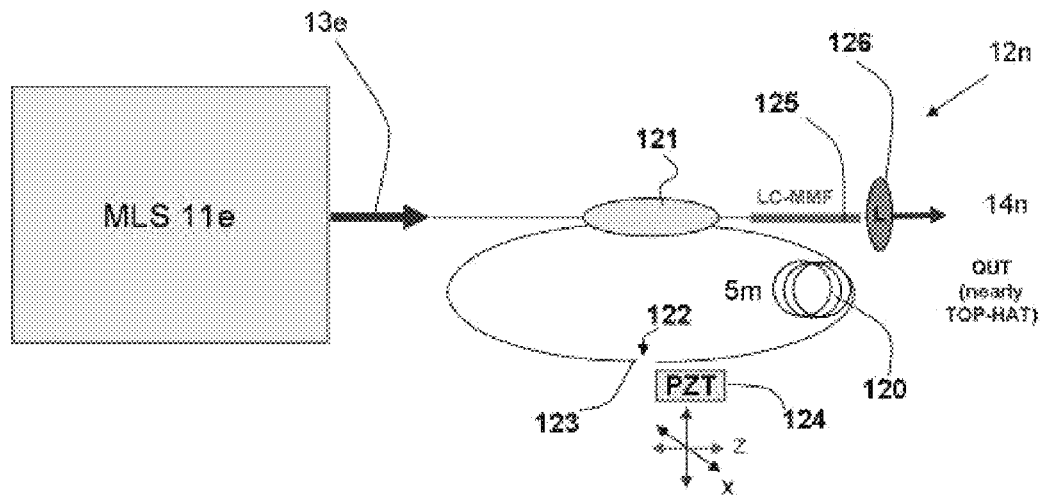

The EM 12n of FIG. 24 is substantially the same as the EM 12k of FIG. 21, with the addition of an air gap 122 between the fiber end 123 and coupled fiber end mounted to PZT 124, to provide output illumination 14n. The air gap 122 and coupling are thereby varied by the vibration introduced by the PZT 124. The fiber coupler 121, optional fiber coil 120, large core MMF 125, and lens system 126 of FIG. 24 is the same as 99, 100, 102, and 104 of FIG. 21, respectively. An illustration of an air-gap introduced between two MMF ends in a single re-circulating interferometer is shown for example in FIG. 37. FIG. 24 represents a combination of EM Type J, F, B, and C of Table 1 below.

Figure 25:
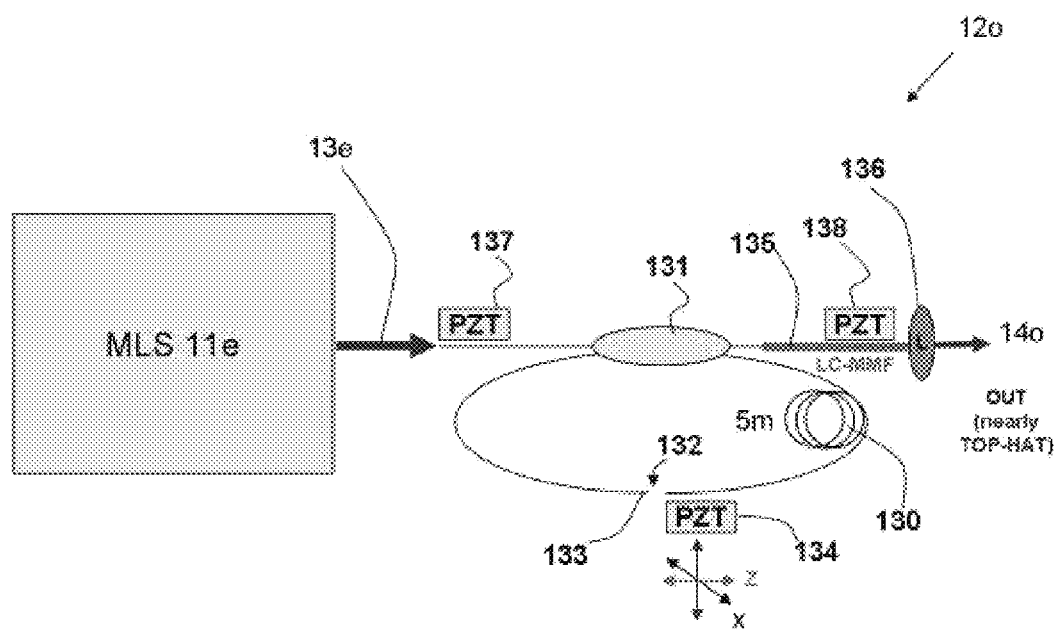

The EM 12o of FIG. 25 is substantially the same as the EM 12n of FIG. 22, with the addition of an air gap 132 between the fiber end 133 and coupled fiber end mounted to PZT 134, to provide output illumination 14o. The fiber coupler 131, optional fiber coil 130, large core MMF 135, lens system 136, PZT 137 and PZT 138 of FIG. 25 is the same as 99, 100, 102, 104, 105a, 1056 of FIG. 22, respectively. FIG. 25 represents a combination of EM Type J, F, B and C of Table 1 below.

Figure 26:
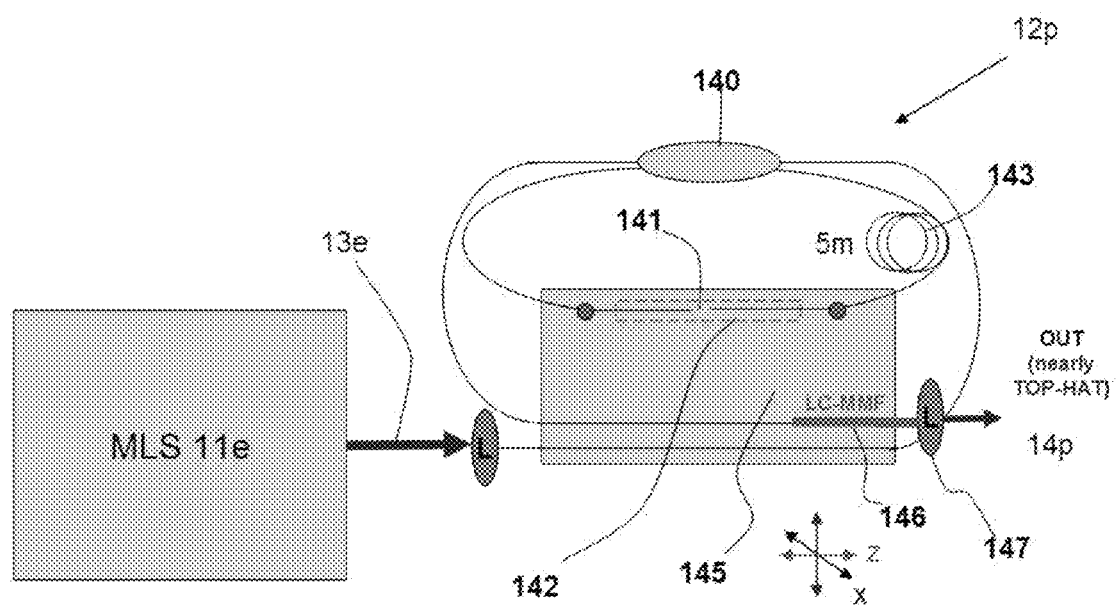

The EM 12p of FIG. 26 is substantially the same as the EM 12n of FIG. 24, but with PZT vibrator 124 replaced by PZT plate 145, to provide output illumination 14p. Additionally an optional hollow guide 142 is introduced to constrain the variation in air gap 141 to the z direction. The fiber coupler 140, optional fiber coil 143, large core MMF 146, lens system 147 of FIG. 26 is the same as 121, 120, 125 and 126 of FIG. 24 respectively. FIG. 26 represents a combination of EM Type J, F, B and C of Table 1 below.

Figure 27:
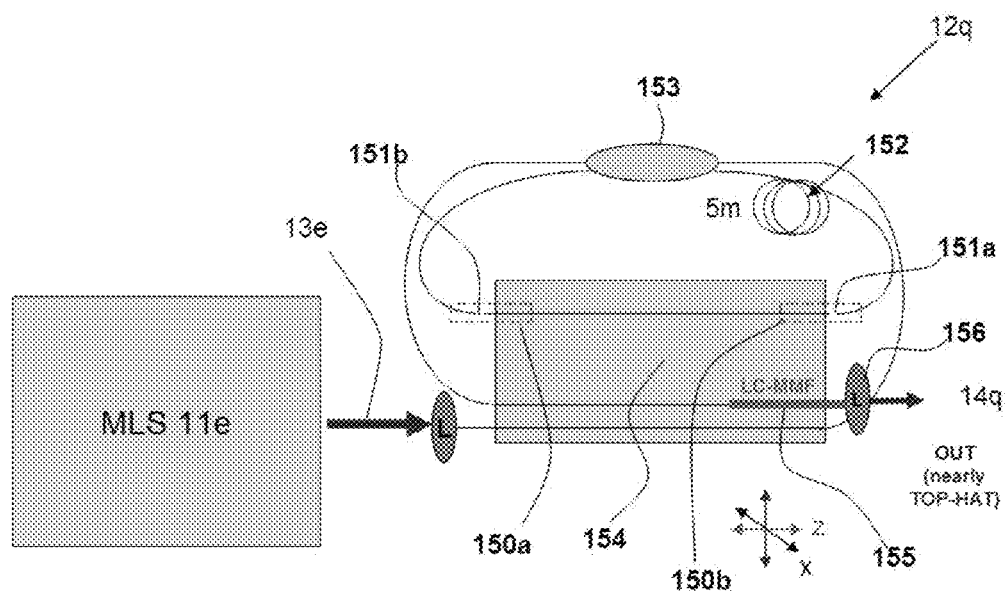

The EM 12q of FIG. 27 is substantially the same as the EM 12p of FIG. 26, but with the single air gap 141 and optional hollow guide 142 replaced by two air gaps 151a and 151b with two corresponding optional hollow guides 150b and 150a, to provide output illumination 14q. The fiber coupler 153, optional fiber coil 152, plate 154, large core MMF 155, and lens system 156 of FIG. 27 are the same as 140, 143, 145, 146 and 147 of FIG. 26, respectively. FIG. 26 represents a combination of EM Type J, F, B and C of Table 1 below.

Figure 28:
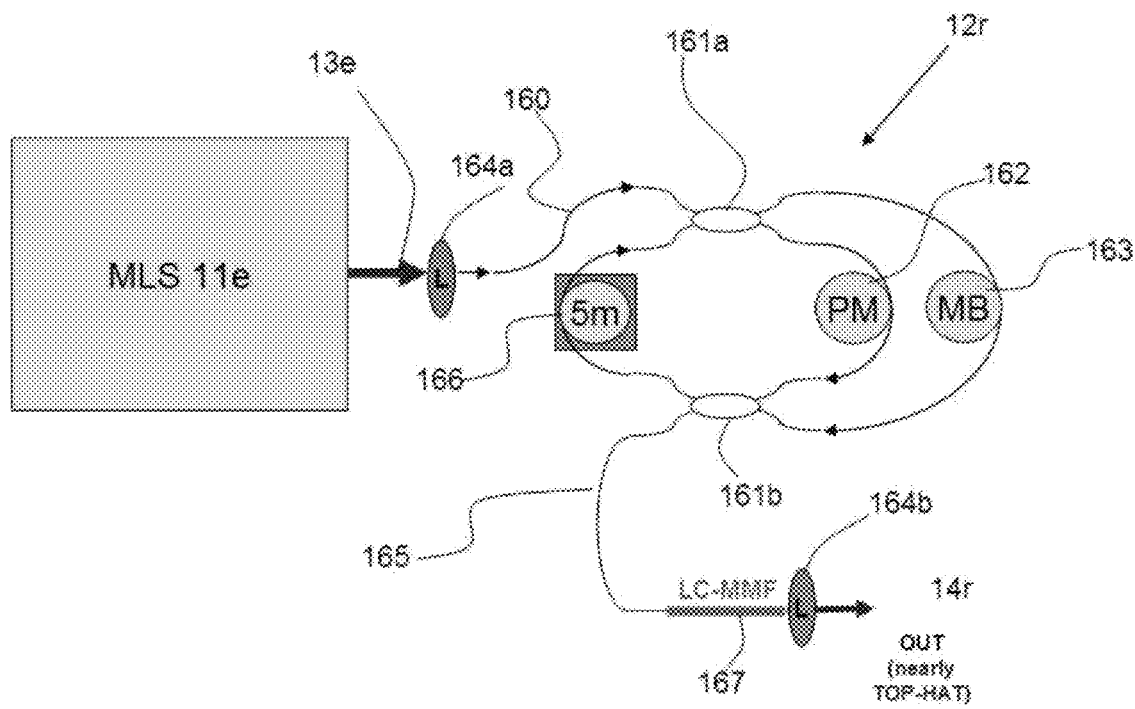

The EM 12r of FIG. 28 shows an illumination 13e from MLS 11e coupled by optical system 164a into fiber 160 which guides the light into fiber coupler 161a. The light is split by the fiber coupler 161a into two paths. One path passes through a phase modulator element 162 and the other path passes through micro-bending element 163. These two paths are then both coupled into fiber coupler 161b. The light is then split again by fiber coupler 161a into two paths. One path passes through an optional coiled fiber 166 that may also be thermally attached to the MLS 11e, and back to fiber coupler 161a resulting in unidirectional recirculation. The thermal variation in 166 will result in phase variations that will further reduce coherence and speckle of the output 14r. The other path 165 leads to the large core MMF 167 and output optical system 164b. In this arrangement, elements 162 and 163 are functionally in parallel. FIG. 28 represents a combination of EM Type K, H, G and E of Table 1 below.

Figure 29:
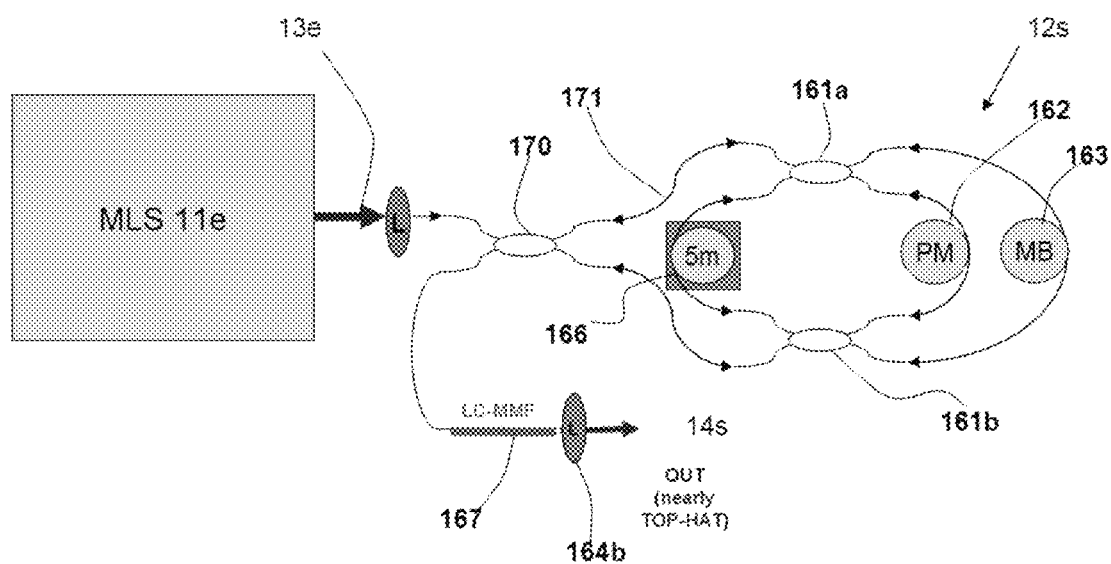

The EM 12s of FIG. 29 is substantially the same as the EM 12r of FIG. 28, but with the addition of a third fiber coupler 170 to achieve bidirectional recirculation as indicated by the arrows in FIG. 29 pointing both directions along the Fiber path 171, to provide output illumination 14s. In this arrangement, elements 162 and 163 are functionally in parallel. FIG. 29 represents a combination of EM Type K, H, G and E of Table 1 below.

Figure 30:
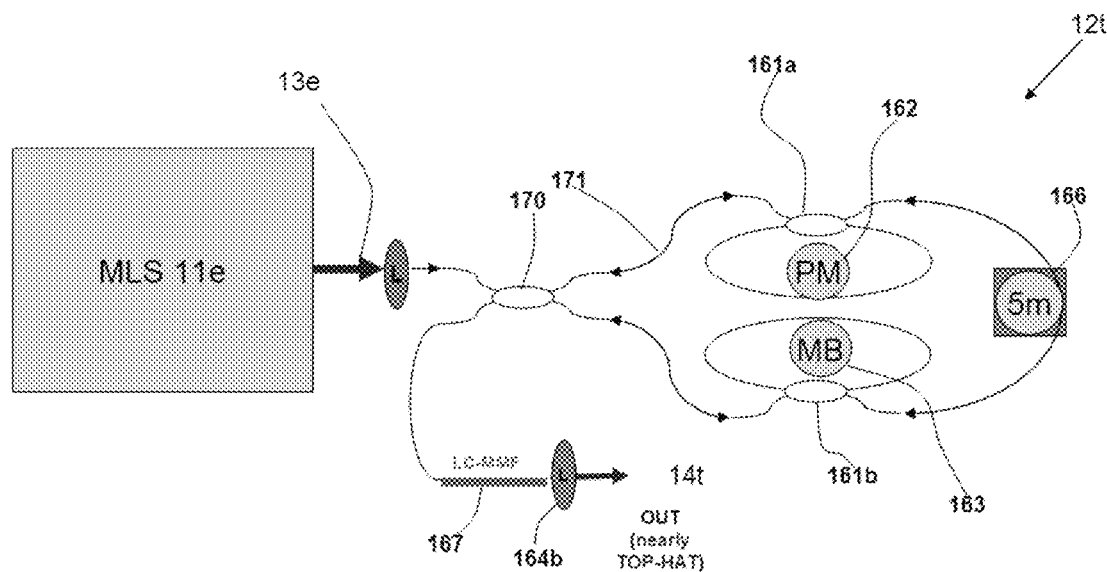

The EM 12t of FIG. 30 is substantially the same as the EM 12s of FIG. 29, but with a variation in the location of phase modulator element 162, micro-bending element 163, coiled fiber 166, to provide output illumination 14t. In this arrangement, elements 162 and 163 are functionally in series. Also, the optical fiber couplers 161a and 161b each have a self recirculation loop through 162 and 163 respectively. FIG. 30 represents a combination of EM Type K, H, G and E of Table 1 below.

Figure 31:
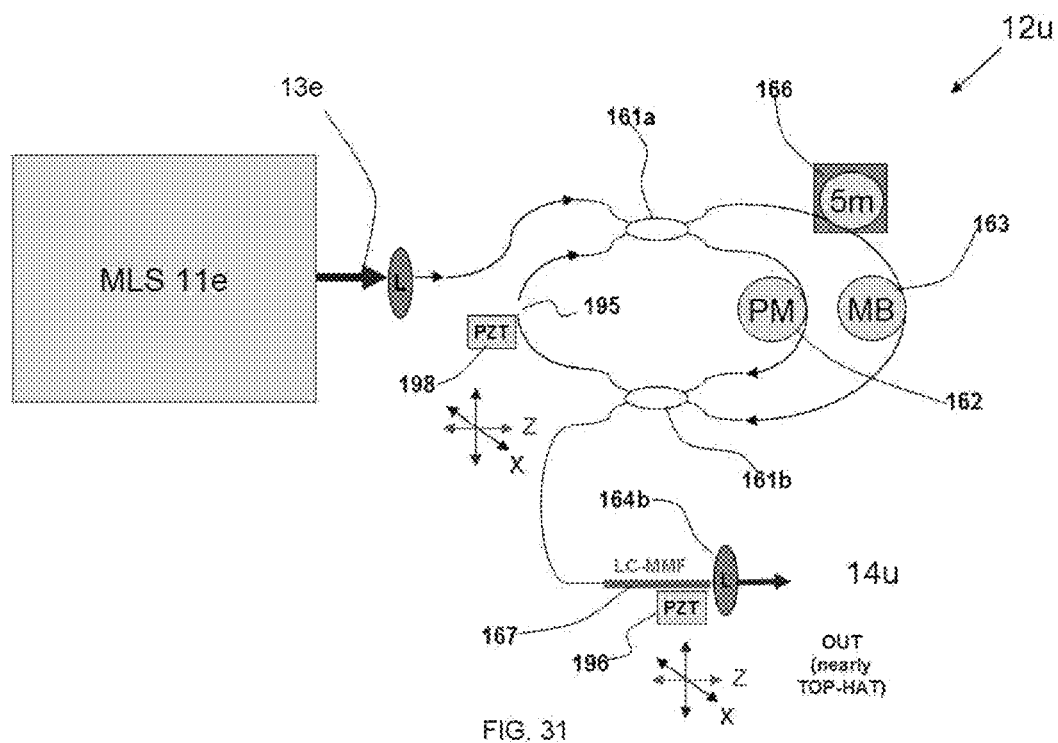

The EM 12u of FIG. 31 is substantially the same as the EM 12r of FIG. 28, but with coiled fiber 166 moved to the micro-bending element 163 arm and also replaced by air gap 195 and PZT 198, to provide output illumination 14u. The air gap 195 is modulated by vibration of the PZT 198. A PZT device 196 is coupled to MMF 167, such as also shown in EM 121 described earlier. FIG. 31 represents a combination of EM Type K, H, G, F, E and C of Table 1 below.

Figure 37:
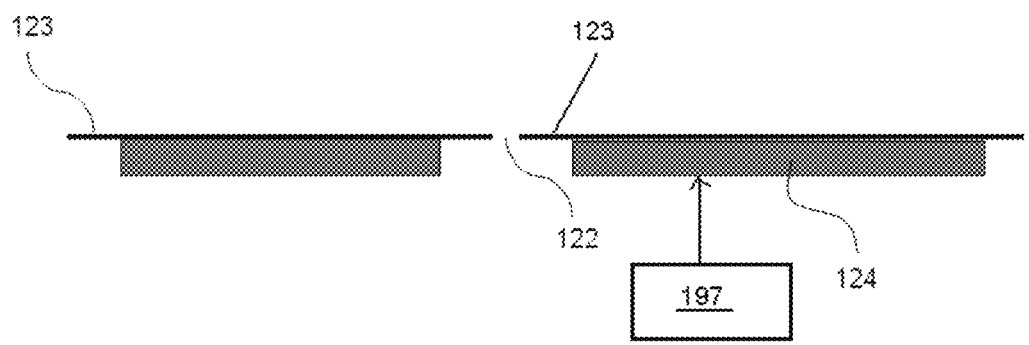
FIG. 37 is an illustration of the air gap introduced between two multimode fiber ends in the single recirculating interferometer of the EM section of FIGS. 24 and 25.

The air gap shown in FIG. 24 is shown in more detail in FIG. 37, where PZT device 124 represents a plate (shown in cross-section), and one end of MMF 123 is adhesively bonded (e.g., glued) to the plate and spaced from the end of the same or different MMF (in the case of FIG. 24 each of the ends are from the same MMF 123 and face each other via gap 122). For example, the plate may be 150 microns thick. One of MMF 123 ends is attached the PZT plate, while the other end is held stationary in a fixture or bonded to a stationary plate (or device) with respect to the movable PZT plate. Air gap modulation of FIGS. 25 and 31 may similarly be provided using PZT devices 134 and 198, respectively, with respect to air gaps 132 and 195, respectively, to provide desired speckle-free output from their associated EMs.

PZT devices 124, 134, and 198, like other PZT (PVDF) devices or vibratory induced materials described herein, are movable to induce vibrate (in one or more orthogonal dimensions) to optical elements coupled thereto, in response to applied signals (drive voltages), as typical of PZT devices and materials, such as ceramic lead zirconium titanate. Signals in FIG. 37 (shown by an arrow) are applied via a driver (or circuitry) of a controller 197 (e.g., programmed microcontroller or other logic device) to control PZT minute movements. For purposes of illustration, controllers of the vibration inducing devices and materials of the EM or MLS are not shown in other figures. Where multiple PZT devices or materials are utilized in an EM, the same controller (or a different controller) can output signals, or such controller may be part of electronic circuitry of an MLS 11 when present with the EM 12. Other vibration inducing means than PZT or PVDF devices and material may also be used, such as magnetostrictive, electro-motive or electro-acoustic.

Figure 32:
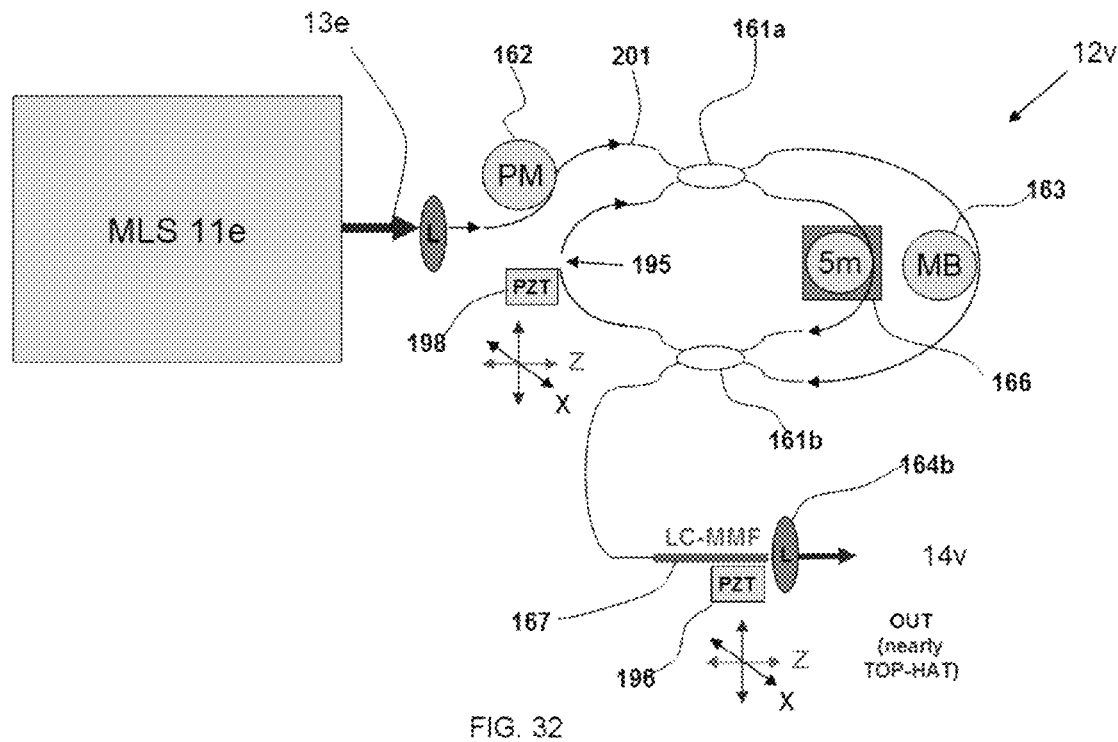

The EM 12v of FIG. 32 is substantially the same as the EM 12u of FIG. 31, but with phase modulator 162 moved to the input fiber 201 and replaced by the coiled fiber 166, to provide output illumination 14v. FIG. 32 represents a combination of EM Type K, H, G, F, E, and C of Table 1 below.

Figure 33A:
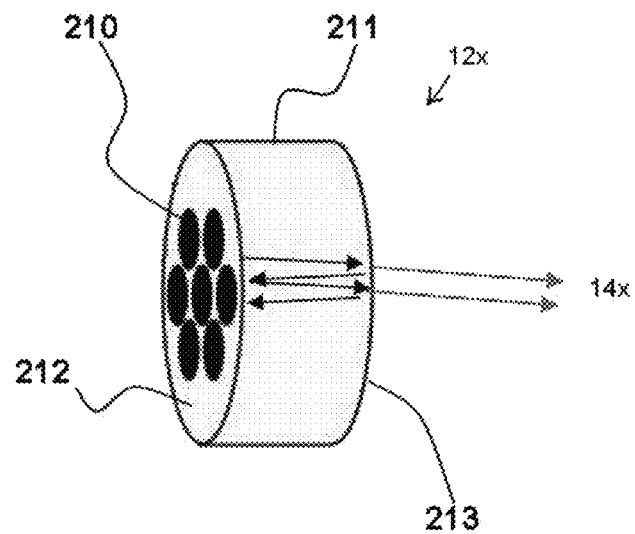

The EM 12x shown in FIG. 33a is provided by a resonator 211, which is an optical element having a high reflector (reflective surface) 211, and a partial reflector (reflective surface). In resonator 211, each beam of several individual lasers 210 passes through a small opening in the high reflector 212 and is then partially reflected by the partial reflector 213 back into the resonator 211 in which the round trip path length is greater than the coherence length of any one of the lasers 210 such that each round trip results in an output beam 14x that is incoherent with the original beam as well as the other output beams. The theoretical speckle contrast decreases with increasing number of lasers 210 and increasing output coupler reflectance as shown in FIG. 33B. The resonator 211 may be stationary or vibrated to induce further speckle reduction though temporal integration, such as by a vibratory inducting actuator, e.g., PZT device. FIG. 33A represents EM Type L of Table 1 below.

Figure 34C:
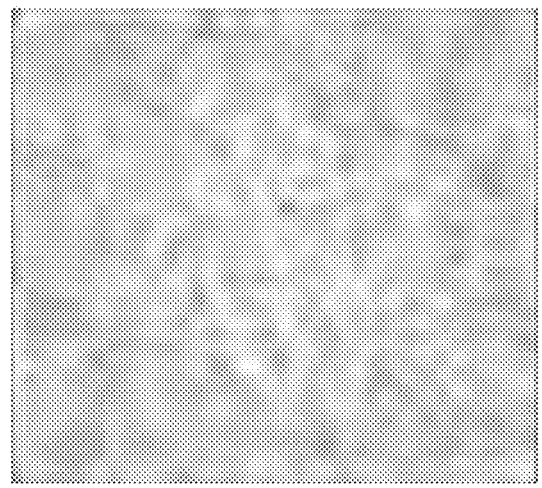

The EM 12y shown in FIG. 34A is a diffractive optical element 221 which creates a spatially homogeneous beam 222 through generation of an array of over lapping spots such as shown in FIG. 34B, or a single homogenized top hat distribution shown in FIG. 34C. The total divergence angle of the spatially homogeneous beam 222 may also be discreetly varied through the selection of difference diffractive optical elements 221. The diffractive optical element 221 may use a collimated or diverging beam as an input source 220 in order to achieve a homogenized beam 222 output 14y. The diffractive optical element 221 may be fixed or vibrated to induce further speckle reduction though temporal integration, such as by a vibratory inducting actuator, e.g., PZT device. Multiple such homogenized beams 222 may also be multiplexed in the far field to reduce objective and subjective speckle. FIG. 34A represents EM Type M in Table 1 below.

Figure 35:
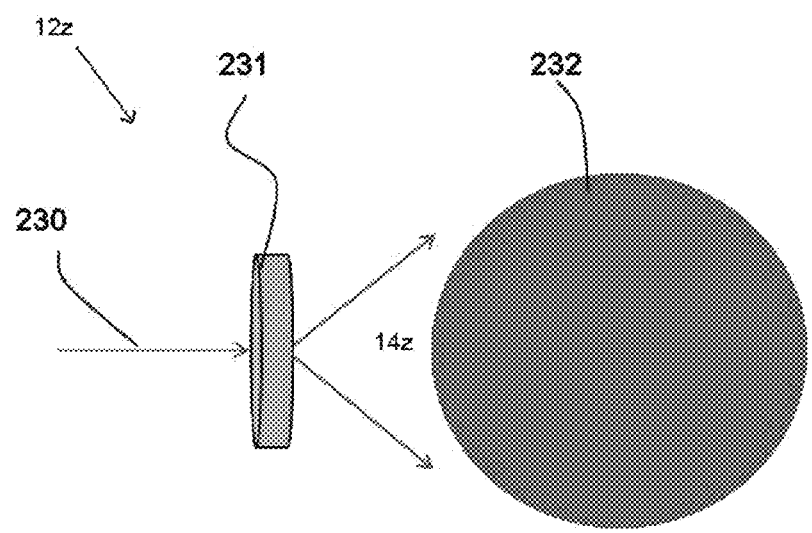

Referring to FIG. 35, an EM 12z is shown having a diffuser 231 which creates a spatially homogeneous beam 14z as illustrated by a homogenized or top-hat distribution 232. The total divergence angle may also be discreetly varied through the selection of difference diffusers 231. The diffuser 231 may use a collimated or diverging beam as an input source 230 in order to achieve a homogenized beam output 232. The diffuser 231 may be fixed or vibrated to induce further speckle reduction though temporal integration, such as by a vibratory inducting actuator, e.g., PZT device. Multiple such homogenized beams may also be multiplexed in the far field to reduce objective and subjective speckle. FIG. 35 represents EM Type N in Table 1 below.

System 10 may combine different functionalities into a single component or apparatus in order to meet desired volume and weight in a miniaturized housing 9 (FIG. 1). A lens may be directly formed on a fiber though the figures may show a separate lens 21 in front of an EM optical fiber. Similarly, instead of bonding a fiber tip onto a piezoelectric component, the optical fiber may be directly coated with a piezoelectric jacket, thus making the system 10 more compact and reliable. Also, although MLS 11e is shown in various figures having an EM, MLS 11a-d may similar be used with EM 12a-z in system 10.

Accordingly, different types of MLS 11a-e and EM 12a-z have been shown above which may be used in conjunction with each other as the MLS 11 and EM 12 of FIG. 1, or separately from each other, to provide the desired level of speckle reduction for an imaging or targeting application. The vibrator inducing mechanisms above which enable phase modulation of laser illumination passing through the EM are sufficiently small enabling housing 9 having the EM 12 without or with MLS 11 to be compact while achieving the desired reduced speckle laser output. Signals to vibrator inducing mechanisms may be provided by the same electronics of the MLS 11, or by other electronics of the EM 12 to enable desired phase changes in the laser illumination passing through the EM to reduce speckle in such laser illumination output. Also MLS imaging optics 21 may be used to improve coupling from the MLS 11e (or other MLS 11a-d) into the EM 12k-v through for example focused coupling into fiber 70, 82, 90, 98 of EM 12c-g, 12h, 12i-j, 12k-l, respectively.

A list summarizing the different modulation methods of EM 12, types of MLS 11, and spatial formats of MLS laser sources or beams in the output illumination as described above are shown in Table 1, where modulation by EM are denoted by Types A through N associated with figures as referenced earlier. In Table 1 the following abbreviations are utilized: MOD: modulated, GTM: Gated Time-Multiplexed, PM: polarization-multiplexed, WM: wavelength multiplexed, CER: cat's eye reflector, CM: chirped mirror, MMF: Multi-Mode Fiber.

TABLE 1

| FIG. # | Multiplexed Laser Source—N lasers M ON at any time (M = 1 ... N) | # | EXTERNAL MODULATION OF PHASE & MODAL POWER DISTRIBUTION | # | Output |
|---|---|---|---|---|---|
| 2 | MOD-GTM-PM | A | Vibrating phase plate or transparent piezo-film (non-rotating) (a) No MMF, focused incidence (b) With tapered MMF, wide aperture at incidence | 1 | Spatially overlapping |
| 2 | MOD-GTM-WM | B | Vibrating input end of MMF, Preferably small-core | ii | Spatially resolved- (a) Angular (b) Position |
| 5 | MOD-GTM-PM-WM | C | Vibrating output end of MMF, Preferably large-core | | |
| 4 | MOD-GTM-PM-CER/CM | D | Vibrating Single-point squeezed MMF | | |
| 4 | MOD-GTM-WM-CER/CM | E | Vibrating Distributed Bending (a) Uniform (b) Chirped (c) Multi-period | | |
| 7 and 8 | MOD-GTM-PM-WM-CER/CM | F | Vibrating Fiber Air-Gap Modulation (a) Free-space coupling through short gaps (b) Coupling with optical elements, large air gaps: GRIN lens, Drum lens, Ball lens, Fresnel lens, Spherical lens, lensed fiber termination | | |
| | | G | Vibrating Distributed Twisted Coil MMF (a) Single MMF (b) Multi-fiber coil, with 1 × 7 fused fiber coupler | | |
| | | H | Thermal Modulation of Twisted Coil MMF | | |
| | | I | Bulk-optic modulator with partial reflectors, matrix of pixels (a) Electro-optic (b) Piezo-electric transparent PVDF film, laminated | | |
| | | J | Recirculating Interferometer, with single fiber coupler | | |
| | | K | Recirculating Interferometer, with multiple fiber couplers | | |
| | | L | Vibrating or Stationary Partial Reflector Resonator, with or without fiber coupling | | |
| | | M | Vibrating or Stationary Diffractive Optical Element i.e., Array Generator, Beam Shaper, Homogenizer | | |
| | | N | Vibrating or Stationary Diffuser | | |

The following provides more details of EM Types A-N for enabling speckle reduction. Consider first the phase plate in EM Type A which is vibrated as opposed to rotated, as described in U.S. Pat. No. 6,952,435. The dynamics of vibration are very different from those of rotation. The incident laser beam is focused on the phase plate in order to overcome the limitations imposed by the very limited physical movement allowed by forced vibration modes even when at resonance. Optionally, such phase plate is followed by a multimode fiber (MMF) with a tapered input end, so that a larger area of the phase plate can be accessed when the optical power budget is critical. The mechanical load and the drive voltage applied to the piezoelectric plate can both be reduced. Another option of EM Type A is the use of a piezoelectric, optically transparent, polyvinylidene fluoride (PVDF) film that is coated with indium tin oxide (ITO) driven by an electrical signal. This film can modulate both the optical phase and polarization of the transmitted light. The ITO can also be patterned so that a pixel-matrix modulator becomes possible. Such a modulator may be placed either at the input or the output end of the MMF, in order to reduce the speckle effects. An added merit of these PVDF films is that they can be driven with voltages as low as few volts by virtue of their small thickness of ~100 microns, thus making them extremely efficient optical phase and polarization modulators. This meets well the requirements of some speckle-free illuminator systems wherein the power source is limited to 3V lithium cells.

In general, vibration may be imparted at any section along the MMF to result in modulation of the phase and nodal power distribution at the output of the MMF. Any oscillatory phase modulation over the length of the MMF is required to fulfill the $J_0$(null) condition for the chosen frequency of vibration. In this mode of operation, the speckle arising from the interference of multiple paths, for pairs of which the phase difference is modulated per that condition, completely fades away. Any residual speckle not washed out by this condition can be attributed to residual beam paths that are not accessed by the actuation.

In EM Type B, the coupling of the laser beam into the input end of the MMF is vibrated. A small-core MMF (SC-MMF) is preferred in order to maximize the modulation coefficient. In EM Type C, the output end of the MMF is vibrated. A large-core MMF (LC-MMF) is preferred so that the laser beam at the target is not overly sensitive to the vibration even as the speckle at the target moves rapidly enough due to said vibration. In general, LC-MMF is preferred everywhere after the input SC-MMF section up to the output termination, especially where uniform (top-hat) illumination from the output is desired. However, commercial devices and components, such as fused fiber couplers, used in telecommunication currently use SC-MMF, and are therefore substituted for the LC-MMF where not readily available. In EM Type D, the MMF is squeezed and vibrated at a single point along the fiber length, resulting in direct rotation of the speckle as well as oscillatory modal power change, polarization change and phase change. In EM Type E, distributed bending of the MMF is done in one or more of three ways, namely, (a) uniform bending over the uniform surface of the actuator, (b) continuously chirped-period bending, and (c) bending over multiple segments with various periods. As the actuator vibrates, the pins 93 modulate the stresses at the points of bending, thus leading to highly sensitive rotation of the speckle accompanied by phase modulation as well. In EM Type F, an air-gap is introduced in the path of the MMF. In the free-space propagation implementation, the two ends of the MMF forming the air-gap are separated by less than 10 µm, and light is directly coupled between the two ends in either direction. Further, these cleaved ends will result in Fresnel reflections enhancing the speckle averaging effect. Optical components such as GRIN lenses, ball lenses, drum lenses, spherical lenses, Fresnel lenses, or lensed fiber tips such as the Optifocus termination can be utilized to increase the coupling efficiency between the two fiber ends. In EM Type G, the MMF is twisted and coiled around a vibrating actuator and operated at the $J_0$(null) condition. A 1×7 fused fiber coupler may be utilized to split the incident laser beam into seven MMF paths, each of which is wound on the same actuator. At the output end, the seven fiber ends are arranged in a hexagonal pattern with a central core. In this spatially resolved output configuration, the seven paths followed by the individual beams reduce substantially the effective averaged speckle. In EM Type H, the heat generated by the lasers is itself utilized to sweep the phase of the light and the modal power distribution within the MMF. This does not require any applied electrical power for actuation, as the heat dissipated by the lasers is wasted anyway. Indeed, the high temperature sensitivity of the MMF results in a continuous rapid sweep of the speckle over an extended time. In EM Type I, a bulk-optic modulator, either of the electro-optic or the piezoelectric kinds, is modified with partial reflectors on either end so that weak interference results. The phase modulation is then operated at the $J_0$(null) condition, enabling the washout of the fringes or the speckle from the multipath interference. The transparent PVDF film represents a standalone bulk-optic phase and polarization modulator that can function as a weak interferometer due to the partial reflectivity of the ITO electrodes at the optical wavelengths. As mentioned earlier, this film can also be patterned as a matrix of pixels, enabling high-resolution scrambling of the speckle. Further, a number of such patterned films may be concatenated and driven such that a higher order of net scrambling of the speckle can be achieved. EM Type J, a recirculating interferometer utilizing a single fiber-fused coupler enables multibeam interference and effectively recycles residual power. In EM Type K, multiple fused-fiber couplers are utilized in various ways to form multiple recirculating interferometers with partially overlapping paths or sequentially cascading paths.

An example EM Type E is shown in FIG. 36 having two 5-meter lengths of MMF coiled around a single PZT cylinder/tube to provide matrix device 91 of FIG. 19A and FIG. 20, such that:

(a) the chirped bending segments, formed by metal pins 93 attached to the PZT tube 92, generated rapid, large-amplitude speckle rotation; and (b) the uniform bending segment provided phase modulation (residual frozen twist in the fiber in this section would result in some mode-coupling).

In EM Type L, the beam is partially reflected into a resonator where the round trip path length is greater than the coherence length of the laser such that each round trip results in an output beam that is incoherent with the original beam as well as the other output beams. The resonator may be stationary or vibrated to induce further speckle reduction though temporal integration.

In EM Type M, a diffractive optical element is used to create a spatially homogeneous beam through generation of an array of overlapping spots or a single homogenized top-hat distribution. The total divergence angle may also be discretely varied through the selection of difference diffractive optical elements. The diffractive optical element may use a collimated or diverging beam as an input source in order to achieve a homogenized beam output. The diffractive optical element may be fixed or vibrated to induce further speckle reduction though temporal integration. Multiple such homogenized beams may also be multiplexed in the far field to reduce objective and subjective speckle.

In EM Type N, a diffuser is used to create a spatially homogeneous beam with a homogenized or top-hat distribution. The total divergence angle may also be discretely varied through the selection of difference diffusers. The diffuser may use a collimated or diverging beam as an input source in order to achieve a homogenized beam output. The diffuser may be fixed or vibrated to induce further speckle reduction though temporal integration. Multiple such homogenized beams may also be multiplexed in the far field to reduce objective and subjective speckle.

Although used individually, combinations of the EM Types A through N may be provided in which light output by one EM is received by the other EM (and so forth if desired) such that a cascade of multiple EMs of the same or different types can be made in order to minimize the speckle effects in laser illumination Table 2 below shows several sets of the timing of the high's (1) and the low's (0) of the lasers over different segments of time of the four laser MLS 11c-e of FIGS. 5, 7 and 8, where laser Nos. 1-4 correspond to lasers 29-31, respectively.

TABLE 2

Two Lasers ON at any time: Example sets of Time-Multiplexing

| Laser # | Time | | | |
| --- | --- | --- | --- | --- |
| | SEG 1 | SEG 2 | SEG 3 | SEG 4 |
| 1 | 1 | 0 | 1 | 0 |
| 2 | 1 | 0 | 0 | 1 |
| 3 | 0 | 1 | 1 | 0 |
| 4 | 0 | 1 | 0 | 1 |
| 1 | 1 | 1 | 0 | 0 |
| 2 | 1 | 1 | 0 | 0 |
| 3 | 0 | 0 | 1 | 1 |
| 4 | 0 | 0 | 1 | 1 |
| 1 | 1 | 0 | 0 | 1 |
| 2 | 0 | 1 | 1 | 0 |
| 3 | 0 | 1 | 1 | 0 |
| 4 | 1 | 0 | 0 | 1 |

Such modulation involves both electronic and optical means, and cooperation between the said two means. Electronic gating, drive current modulation, and modulation of optical feedback to the lasers from feedback elements 40, 41, and 60 (e.g., retro-reflectors) in a four laser MLS (as well as feedback element 22, e.g., reflector, in a two laser MLS) together can result in substantial speckle reduction in MLS 11c-e.

A distinguishing feature of the modulation employed is that multiple instances of modulation in system 10 can be random in the most general sense and mutually independent, as full advantage is taken of the temporal and spatial averaging of the speckle in the detection and imaging process.

Multiple combinations of different one of MLS 11a-e and EM 12a-z may be implemented to achieve a desired level of net speckle reduction, and the scope of this application covers all such multiple combinations beyond the representative embodiments presented here. Further each of MLS 11a-e and EM 12a-z may be used apart from system 10 as a separate apparatus or component in another system.

From the foregoing description, it will be apparent that a system providing laser illumination with reduced or zero speckle using a MLS and EM apparatuses, and MLS and EM apparatus which may operate as separates apparatus apart from the other, have been provided. Variations and modifications of the herein described system, apparatuses, and methods will undoubtedly suggest themselves, to those skilled in the art. Accordingly the foregoing description should be taken as illustrative and not in a limiting sense.

The invention claimed is:

1. A system providing laser illumination having reduced or zero speckle comprising:
   a plurality of laser sources each providing laser illumination;
   optics for combining the laser illumination into output illumination; and
   means for time-multiplexing the operation of the laser sources to provide said output illumination have reduced or zero speckle, wherein said optics comprises one or more optical elements for combining the laser illumination of two different ones of said laser sources each along a first path for inclusion in said output illumination, one or more optical feedback devices in which each of said one or more optical feedback devices optically feeds back light from at least one of said one or more optical elements along a second path different from said first path of the optical element in a direction back to the optical element, in which said optical feedback device is movable to induce one of time-dependent modulation of the temporal modal structure, coherent collapse mode, coherent collapse mode, or swept-frequency mode, in said laser illumination of said two different ones of said laser sources which were combined by said optical element.

2. The system according to claim 1 wherein two of more of said laser sources are of different polarizations, and said optics combine the laser illumination of said laser sources to polarization-multiplex said output illumination.

3. The system according to claim 1 wherein two of more of said laser sources are of different wavelengths and said optics combine the laser illumination of said laser sources to wavelength-multiplex said output illumination.

4. The system according to claim 1 wherein two of more of said laser sources are of different polarizations, two of more of said laser sources are of different wavelengths, and said optics combine the laser illumination of said laser sources to polarization-multiplex and wavelength-multiplex said output illumination.

5. The system according to claim 1 wherein the laser illuminations of said laser sources are spatially overlapping, or spatially resolved in exit angle or position, in said output illumination.

6. The system according to claim 1 wherein said means for time multiplexing turns on only one or more of said laser sources at a time, while one or more of said laser sources and off.

7. The system according to claim 6 wherein said means for time multiplexing further comprising modulating each laser source when on faster than the rate said laser sources are multiplexed on and off.

8. The system according to claim 1 wherein the wavelengths of the laser sources are within the UV, Visible, or IR bands.

9. A system providing laser illumination having reduced or zero speckle comprising:
   a plurality of laser sources each providing laser illumination;
   optics for combining the laser illumination into output illumination; and
   means for time-multiplexing the operation of the laser sources to provide said output illumination with reduced or zero speckle, wherein said output illumination represents a first output illumination, and said system further comprises an external modulator having means for modulating said first output illumination to provide second output illumination in which said second output illumination has less speckle than said first output illumination, and said modulating means modulates said first output illumination by passing said light along an optical fiber via one of an optically transparent phase plate, piezoelectric thin film, or electro-optic thin film which is vibrated to enable said modulation.

10. A system providing laser illumination having reduced or zero speckle comprising:
 a plurality of laser sources each providing laser illumination;
 optics for combining the laser illumination into output illumination; and
 means for time-multiplexing the operation of the laser sources to provide said output illumination with reduced or zero speckle, wherein said output illumination represents a first output illumination, and said system further comprises an external modulator having means for modulating said first output illumination to provide second output illumination in which said second output illumination has less speckle than said first output illumination, and said modulating means modulates said first output illumination by inputting said light along an optical fiber in which said optical fiber has an input end and an output end, and one or more of said input end and said output end is vibrated.

11. A system providing laser illumination having reduced or zero speckle comprising:
 a plurality of laser sources each providing laser illumination;
 optics for combining the laser illumination into output illumination; and
 means for time-multiplexing the operation of the laser sources to provide said output illumination with reduced or zero speckle, wherein said output illumination represents a first output illumination, and said system further comprises an external modulator having means for modulating said first output illumination to provide second output illumination in which said second output illumination has less speckle than said first output illumination, and said modulating means comprises an optical fiber which receives said first output illumination, and at least one actuator coupled to said optical fiber which is vibrated to modulate said first output illumination.

12. A system providing laser illumination having reduced or zero speckle comprising:
 a plurality of laser sources each providing laser illumination;
 optics for combining the laser illumination into output illumination; and
 means for time-multiplexing the operation of the laser sources to provide said output illumination with reduced or zero speckle, wherein said output illumination represents a first output illumination, and said system further comprises an external modulator having means for modulating said first output illumination to provide second output illumination in which said second output illumination has less speckle than said first output illumination, and said modulating means comprises a single-point squeezed optical fiber, and means for vibrating said optical fiber.

13. A system providing laser illumination having reduced or zero speckle comprising:
 a plurality of laser sources each providing laser illumination;
 optics for combining the laser illumination into output illumination; and
 means for time-multiplexing the operation of the laser sources to provide said output illumination with reduced or zero speckle, wherein said output illumination represents a first output illumination, and said system further comprises an external modulator having means for modulating said first output illumination to provide second output illumination in which said second output illumination has less speckle than said first output illumination, and said modulating means comprises an optical fiber which receives said first output illumination, and at least one vibrating actuator and said optical fiber bends around said actuator by being coiled or wound along said actuator.

14. A system providing laser illumination having reduced or zero speckle comprising:
 a plurality of laser sources each providing laser illumination;
 optics for combining the laser illumination into output illumination; and
 means for time-multiplexing the operation of the laser sources to provide said output illumination with reduced or zero speckle, wherein said output illumination represents a first output illumination, and said system further comprises an external modulator having means for modulating said first output illumination to provide second output illumination in which said second output illumination has less speckle than said first output illumination, and said modulating means comprises a first optical fiber which receives said first output illumination, and said second optical fiber which receives illumination from said first optical fiber, and said modulation is provided by vibrating an air gap formed at an output end of said first optical fiber and an input end of said second optical fiber.

15. The system according to claim 14 wherein said modulating means further comprises an optical coupler between the input end of said first optical fiber and output end of said second optical fiber, said optics coupled being one of a refractive or diffractive optical element.

16. A system providing laser illumination having reduced or zero speckle comprising:
 a plurality of laser sources each providing laser illumination;
 optics for combining the laser illumination into output illumination; and
 means for time-multiplexing the operation of the laser sources to provide said output illumination with reduced or zero speckle, wherein said output illumination represents a first output illumination, and said system further comprises an external modulator having means for modulating said first output illumination to provide second output illumination in which said second output illumination has less speckle than said first output illumination, and said modulating means comprises an optical coupler which splits the light of said first output illumination into a plurality of optical fibers, and a vibrating actuator which said plurality of optical fibers are wound around, and light outputted from said plurality of optical fibers is recombined to provide said second output illumination.

17. A system providing laser illumination having reduced or zero speckle comprising:
- a plurality of laser sources each providing laser illumination;
- optics for combining the laser illumination into output illumination; and
- means for time-multiplexing the operation of the laser sources to provide said output illumination with reduced or zero speckle, wherein said output illumination represents a first output illumination, and said system further comprises an external modulator having means for modulating said first output illumination to provide second output illumination in which said second output illumination has less speckle than said first output illumination, and said modulating means comprises a bulk-optic modulator having two ends, and a partial reflector at each of said ends having a matrix of pixels.

18. The system according to claim 17 wherein said bulk-optic modulator is composed of an electro-optic thin film, or a piezoelectric polyvinylidene fluoride (PVDF) thin film.

19. A system providing laser illumination having reduced or zero speckle comprising:
- a plurality of laser sources each providing laser illumination;
- optics for combining the laser illumination into output illumination; and
- means for time-multiplexing the operation of the laser sources to provide said output illumination with reduced or zero speckle, wherein said output illumination represents a first output illumination, and said system further comprises an external modulator having means for modulating said first output illumination to provide second output illumination in which said second output illumination has less speckle than said first output illumination, and said modulating means comprises a vibrating actuator within a recirculating interferometer utilizing a single fiber coupler or multiple fiber couplers, so that light of said first output illumination traverses the actuator multiple times over multiple round trips, and the interferometer provides said second output illumination that is a combination of multiple recirculated beams differing in optical phase, polarization and modal power distribution.

* * * * *